United States Patent
Peterson et al.

(10) Patent No.: US 11,494,681 B1
(45) Date of Patent: Nov. 8, 2022

(54) QUANTUM INSTRUCTION COMPILER FOR OPTIMIZING HYBRID ALGORITHMS

(71) Applicant: Rigetti & Co, Inc., Berkeley, CA (US)

(72) Inventors: Eric Christopher Peterson, Berkeley, CA (US); Robert Stanley Smith, Emeryville, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 1000 days.

(21) Appl. No.: 16/219,694

(22) Filed: Dec. 13, 2018

Related U.S. Application Data

(60) Provisional application No. 62/757,615, filed on Nov. 8, 2018, provisional application No. 62/633,170, filed on Feb. 21, 2018, provisional application No. 62/598,864, filed on Dec. 14, 2017.

(51) Int. Cl.
*G06N 10/00* (2022.01)
*G06F 15/16* (2006.01)
*G06F 8/41* (2018.01)
*G06N 20/10* (2019.01)

(52) U.S. Cl.
CPC ............ *G06N 10/00* (2019.01); *G06F 8/427* (2013.01); *G06F 15/16* (2013.01); *G06F 8/41* (2013.01); *G06F 8/44* (2013.01); *G06F 8/445* (2013.01); *G06F 8/47* (2013.01); *G06N 20/10* (2019.01)

(58) Field of Classification Search
CPC .......... G06N 10/00; G06N 20/10; G06F 8/10; G06F 8/41; G06F 8/44; G06F 8/445; G06F 8/47
See application file for complete search history.

(56) References Cited

U.S. PATENT DOCUMENTS 10,826,845 B2 * 11/2020 Dadashikelayeh .... G06N 5/003
2021/0132969 A1 * 5/2021 Smith .................... G06N 10/00

OTHER PUBLICATIONS

Berholm, V. et al., "Quantum Circuits with Uniformly Controlled One-Qubit Gates," Physical Reviews A, Oct. 29, 2004, pp. 1-8.
Rigetti, "Forest™ SDK," Date Unknown, five pages, [Online] [Retrieved on Apr. 2, 2019] Retrieved from the internet URL: <https://www.rigetti.com/forest>.

(Continued)

*Primary Examiner* — Terrell S Johnson
(74) *Attorney, Agent, or Firm* — Fenwick & West LLP

(57) ABSTRACT

A compiler for a gate-based superconducting quantum computer compiles hybrid classical/quantum algorithms for quantum processing cells with different configurations. The compiler inputs the algorithm and outputs code in a target language executable by a quantum processing cell of a quantum processing system that can execute the algorithm. The compiler includes various functionality, such as: parsing, analyzing control flows, addressing, compressing, and translating. The compiler optimizes algorithms in various manners using the functionality. Some optimizations include addressing efficiently, compressing based on simulations, and translating for efficient execution of parametric functions. The compiler may function in the environment of a cloud quantum computing system. The cloud quantum computing system may receive algorithms from remote access nodes for execution on local classical and quantum computing systems.

20 Claims, 15 Drawing Sheets

(56) References Cited

OTHER PUBLICATIONS

Shende, V. et al., "Synthesis of Quantum Logic Circuits," IEEE Transactions on Computer Aided Design of Integrated Circuits and Systems, vol. 25, No. 6, Jun. 2006, pp. 1000-1010.
Smith, R. et al., "A Practical Quantum Instruction Set Architecture," Feb. 17, 2017, pp. 1-15.

* cited by examiner

QUANTUM INSTRUCTION COMPILER FOR OPTIMIZING HYBRID ALGORITHMS

CROSS-REFERENCE TO RELATED APPLICATIONS

This application claims the benefit of U.S. Provisional application No. 62/598,864 filed on Dec. 14, 2017, U.S. Provisional application No. 62/633,170 filed on Feb. 21, 2018, and U.S. Provisional application No. 62/757,615 filed on Nov. 8, 2018, all of which are incorporated in their entirety by this reference.

BACKGROUND OF THE INVENTION

1. Field of the Invention

This invention relates generally to compiling hybrid classical/quantum algorithms for execution on a hybrid classical/quantum computing system, and, more particularly, compiling quantum instructions included in the algorithms into hybrid instructions that execute efficiently on the hybrid classical/quantum processing system.

2. Description of the Related Art

A compiler may be configured to convert a computer program written in one programming language (sometimes called the source language) into a different programming language (sometimes called the target language), typically of equal or lower complexity and closer to a machine-executable format. Here, the phrase "programming language" may refer to a "high-level language" (e.g., Common Lisp, ML, JavaScript, Python, C, . . . ), a "low-level language" (e.g., assembly, bytecode, binary machine code . . . ), or to a specified subset of any such language (e.g., C without the use of explicit looping constructs). Bytecode refers to a binary format executable on virtual machines (e.g. Java Virtual Machine). Binary machine code refers to the ultimate execution target of classical processors; such code can be directly executed by a processor designed according to a specific instruction set architecture (ISA). Binary machine code is often described as being "native" to a specific ISA. Examples of ISAs include x86, AMD64, Alpha, Z80, and Arm®. A classical processing system is designed as an implementation of an ISA, and is thus configured to be able to implement all operations defined in the ISA. A compiler for such a system may be designed to translate programs into a particular machine code or to a subset thereof, and any computer with processors conforming to the ISA with which the machine code is associated can execute the program. Alternatively, if a machine conforms to an ISA for which a compiler exists which translates language X to that machine's native code, then a compiler converting language Y to language X may be used in conjunction to provide the effect of translating language Y to the machine's native code.

Unlike classical processing systems, gate-based quantum computers are primarily analog devices that require intermittent calibration to determine an effective operation state. Quantum computers excel at solving complex problems which are nearly or completely unsolvable using classical computation systems. However, quantum computers are highly complex and their hardware systems may be temporally volatile and challenging to implement in an efficient manner. It is also challenging to correctly and efficiently compile algorithms including quantum instructions to execute on the complex and volatile hardware systems. Accordingly, a compiler that can take as input a program for the quantum computation and outputs efficient instructions for execution on a particular quantum processor would be beneficial.

SUMMARY OF THE INVENTION

A compiler for a gate-based superconducting quantum computer can compile a hybrid classical/quantum algorithm for quantum processing cells with different configurations and/or different calibration settings. The compiler has as an input the algorithm and outputs target language code executable by a quantum processing cell of a quantum processing system that can execute the algorithm. (Note that code in a target language in some embodiments is instructions in a target language, and, in other embodiments, is machine instructions.) Herein, the term "target language" may include "machine language" or, "an abstract intermediate representation that maps directly to the machine language." Suitable example languages in which the algorithm might be written include Quil, QASM, Q #, and some abstract intermediate representation that maps directly to machine instructions; suitable example target languages for output include all of the aforementioned, subsets as aforementioned, as well as hardware-specific bytecode and hardware executable machine code. The compiler uses information describing the configuration of a quantum processing cell of the quantum computer when generating the code in the target language. The information can include information describing the quantum operations that a particular quantum processing cell may execute, a native instruction set for a quantum processing cell, the physical layout of the quantum processing system, parameters for waveforms used to manipulate quantum information, optimization routines and policies, and any other information that may facilitate generating efficient code.

The compiler includes various functionalities. For example, the compiler can parse an algorithm into quantum instructions, analyze the parsed algorithm to determine a control flow for quantum instructions included in the algorithm, address quantum instructions to qubits of a quantum processing cell, translate the quantum instructions into a native quantum instruction set for the quantum processing cell to which they are assigned, and translate the quantum instructions into instructions executable by the quantum processing system. The compiler can optimize algorithms in various manners including efficiently addressing quantum instructions to qubits of a quantum processing cell, simulating quantum instructions in concrete mathematical representations (e.g., matrix format, permutation format, etc.) such that their corresponding quantum instructions can be compressed and translating parametric functions into code that can access stored parameters.

The compiler may function in the environment of a cloud quantum computing system. Within the environment various access nodes are configured to generate algorithms. The access nodes transmit the algorithm to a quantum cloud system via a network. The quantum cloud system includes both a classical processing system and a quantum processing system. The classical processing system executes classical instructions of the algorithm while the quantum processing system executes quantum instructions of the algorithm. The compiler executes on the classical processing system and generates code in a target language for executing the quantum instructions on the quantum processing system. The quantum processing system executes the code to determine a result of the algorithm. The quantum cloud system transmits a result of the algorithm to the access node via the network. The quantum cloud system can be configured with various architectures including a monolithic architecture, a micro-service architecture, and a tiered architecture

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

I. Introduction

Quantum computations are fundamentally different from classical computations. Real-world computing applications rarely use solely quantum computations and are generally a hybridization of quantum and classical computations. However, executing quantum computations requires a highly specific set of hardware, and integrating the results of those quantum computations with classical systems is challenging.

Algorithms, when executed, manipulate and read information stored in a quantum bit (i.e. qubit). A qubit is fundamentally different from a classical bit. A classical bit has two possible states, typically represented as a 0 or a 1. Ostensibly, a qubit also has two measurable outcomes which can likewise be represented as a 0 or a 1. However, the state of a qubit is a superposition of the two measurable outcomes, i.e., some probability of a 0 state and some probability of a 1 state. Hence, a qubit can encode more information in its state than a classical bit.

Figure 1:
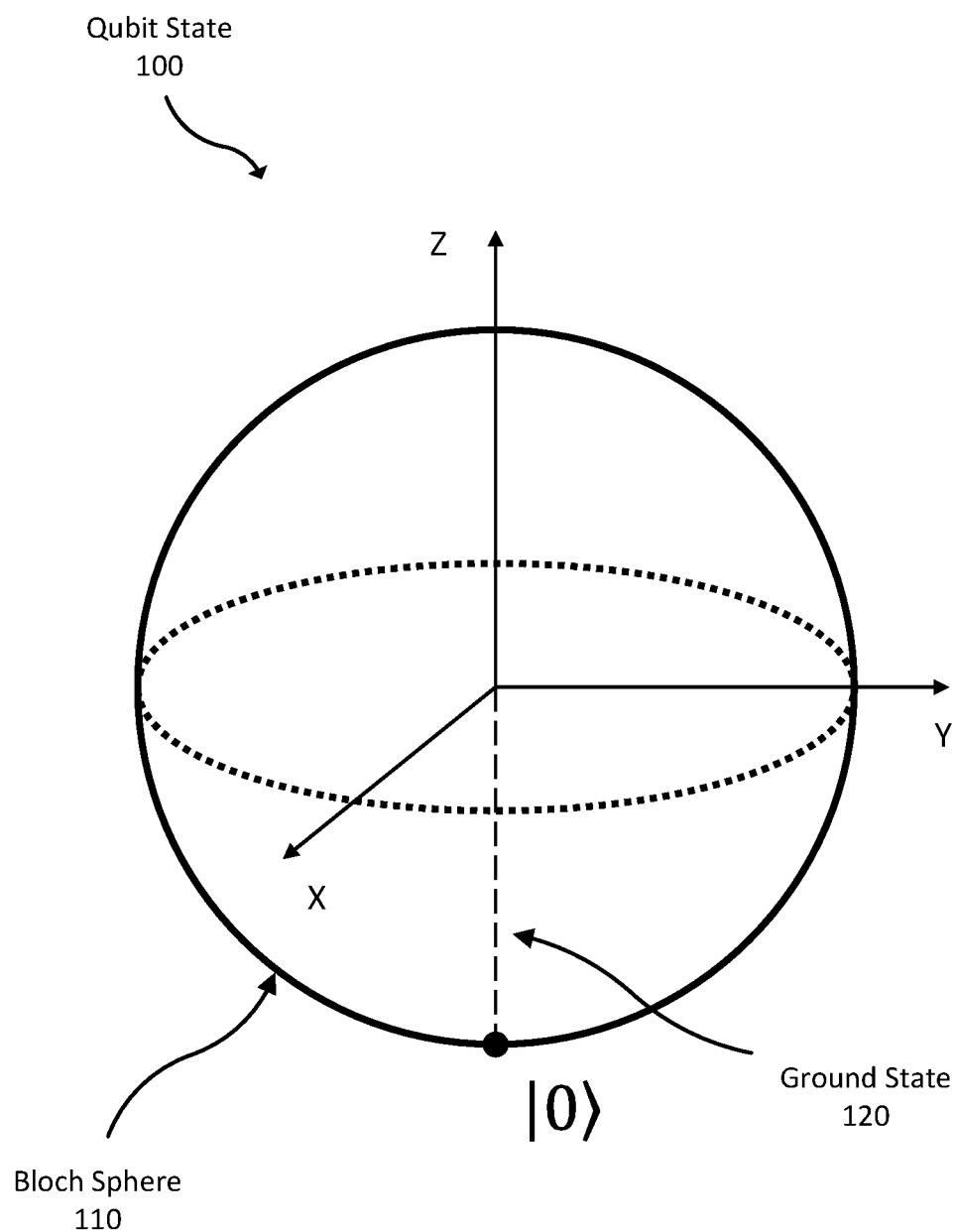
FIG. 1 is an illustration of a ground state represented on a Bloch sphere.

The two measurable outcomes of a qubit are known as the basis states. The basis states can be written as $|0\rangle$ and $|1\rangle$. Accordingly, a qubit state is a linear superposition of the basis states. Thus, a qubit state $|\psi\rangle$ can be represented as a linear combination of $|0\rangle$ and $|1\rangle$: $|\psi\rangle = \alpha|0\rangle + \beta|1\rangle$, where $\alpha$ and $\beta$ are probability amplitudes of the basis states. Measurement of a qubit state is a measurement of the basis states $|0\rangle$ and $|1\rangle$ with probabilities $|\alpha|^2$ and $|\beta|^2$, respectively. Generally, direct measurement of the qubit alters the values of $\alpha$ and $\beta$. FIG. 1 illustrates an example of a qubit state. The illustrated qubit state 100 is the $|0\rangle$ state ("ground state"). The ground state 120 is represented as a vector on the Bloch sphere 110. The Bloch sphere 110 is an illustration commonly used to visualize a qubit state. Various qubit states (i.e., different superpositions of $|0\rangle$ and $|1\rangle$) are represented by different vectors on the Bloch sphere.

Another dissimilarity between a qubit and a classical bit is that multiple qubits can demonstrate quantum entanglement. Quantum entanglement allows a qubit state to express correlation between a set of qubit states that is difficult or impossible to express between classical bits. As an example, the qubit state of two entangled qubits can be expressed as $|\psi\rangle = Y_{00}|00\rangle + Y_{01}|01\rangle + Y_{10}|10\rangle + Y_{11}|00\rangle$ where they values are the probability amplitudes of the entangled states. Thus, multiple qubits can store more information in their states than an equivalent number of classical bits.

Generally, the algorithms described herein are executed on a quantum processing system to encode information into a qubit state (or into the state of a group of qubits), manipulate the qubit state, and measure the qubit state.

Quantum processing systems can require recurring calibration, as hardware used for controlling and measuring qubit states can be highly sensitive to environmental changes. For example, variations in air pressure, humidity, and ambient temperature may affect the accuracy with which a system reads qubit values. Additionally, quantum computing systems can also have widely varying configurations. For example, two quantum computing systems may have differing numbers of qubits and the qubits may be arranged differently in each case. Furthermore, characteristics of qubits and qubit-qubit connections in a quantum computing system can vary with time. Such possibilities for variation in quantum computing systems makes it difficult for one program to be portable across many quantum computing systems.

To make it possible for differently-configured quantum computing systems to execute the same program, details about the configuration of a quantum computer are provided to a compiler along with the program ahead of compilation. Such an information set describing details about a quantum computing system may include general information about the system's configuration (e.g., type of qubits, number of qubits, qubit topology, and operations supported by the system, etc.), and information about current capabilities of the system, as determined based on a most recent calibration of the system (e.g., qubit coherence times, pulse shapes, pulse schedules, etc.). The compiler uses the provided information about the quantum processing system to generate efficient combinations of compatible code in a target language executable by the quantum system.

For convenience, programs including instructions for execution on a quantum processing system are referred to herein as algorithms. As described herein, an algorithm can include any number of instructions for execution on a quantum processing system and/or a classical processing system. As such, the algorithms may be thought of as hybrid classical/quantum algorithms that may be implemented on hybrid classical/quantum systems.

II. Cloud Based Quantum Computing System

Figure 2:
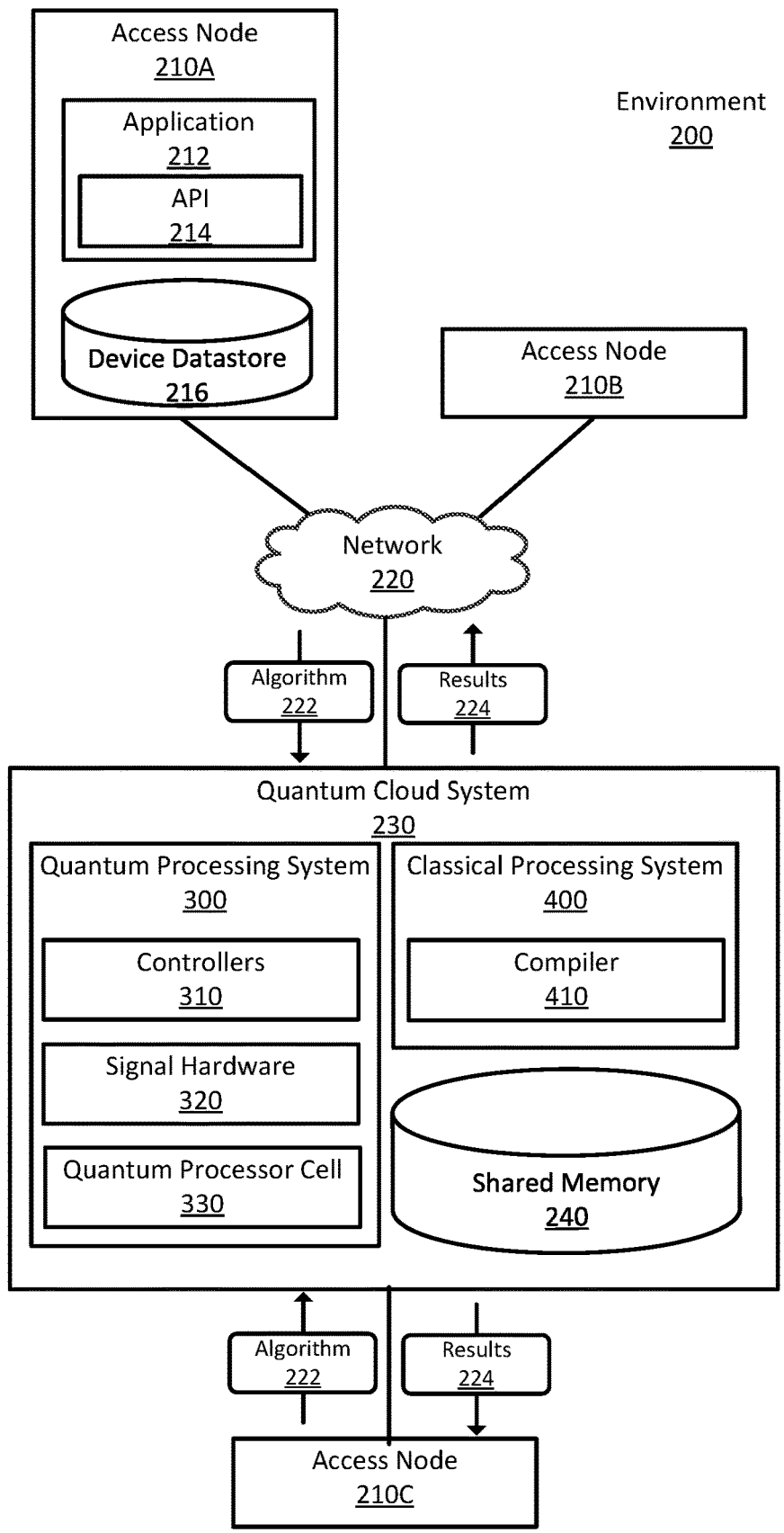
FIG. 2 is an illustration of a cloud-based quantum computing system, according to one example embodiment.

As described above, execution of quantum instructions included in algorithms via a quantum computation system requires a complex set of computational hardware that is typically inaccessible to the general population. However, the described computing environment allows for the remote control and execution of algorithms using a network based quantum computation system. As an example, FIG. 2 is a block diagram of a system environment 200 for a quantum computation system, such as a quantum cloud system, which can provide results 224 of quantum computations and/or classical computations to access nodes remote from the quantum cloud system. The system environment 200 of FIG. 2 includes access nodes 210, a network 220, and a quantum cloud system 230. Alternate embodiments of the system environment can include any number of access nodes 210 and quantum cloud systems 230. The functions performed by the various entities of FIG. 2 may vary in different embodiments. Some example alternate embodiments of the environment 200 are described in Section IX: Example Compiler Implementations.

Within the context of the environment 200 of FIG. 2, a user of an access node 210 generates a set of quantum calculation instructions ("quantum instructions") using an application 212 executing on the access node 210. In some embodiments, the quantum instructions can be written in a defined quantum instruction language as an algorithm (e.g., algorithm 222). An example quantum instruction language Quil is described in "A Practical Quantum Instruction Set Architecture," arXiv:1608.03355v2. More generally, an algorithm 222 can include any computer executable representation of quantum instructions, a series of quantum computations, hardware commands, software commands, programs, or control signals. In various examples, an algorithm 222 can additionally include any number of classical calculation instructions ("classical instructions").

The implementation or execution of the algorithm 222 by the quantum cloud system 230 includes the determination of at least one result (e.g., result 224) of a quantum operation (e.g., reading a qubit or multiple qubits). The access node 210 transmits the algorithm 222 to the quantum cloud system 230. The quantum cloud system 230 receives the algorithm 222, compiles the algorithm 220 for execution on the quantum cloud system 230, and executes the algorithm 222 on the quantum cloud system 230. The quantum cloud system 230 determines the result 224 of the algorithm 222 by executing the algorithm 222 using the classical processing system 400 and the quantum processing system 300 (or any combination of the systems). In various other embodiments, the quantum cloud system 230 can access any other computational resource to execute the algorithm 222 (e.g., a supercomputer or other high-performing computer resource). Accordingly, the quantum cloud system 230 transmits the determined result 224 of the algorithm 222 to an access node 210. A detailed example of an algorithm 222, compiling the algorithm, executing the algorithm 222 using a quantum processing system 300, and measuring a result 224 of the algorithm is described in Section VIII.

This hybridization of classical processing and quantum processing allows for direct integration of quantum computations and classical computations into a familiar classical computer program framework. Executing quantum calculations on a classical system, and classical calculations on a quantum system, while possible, is non-ideal. Thus, the hybrid quantum cloud system 230 allows for leveraging the performance advantages of quantum and classical computations into a single system.

Quantum cloud system 230 can receive any number of algorithms 222 from any number of access nodes 210 in the environment. Additionally, the quantum cloud system 230 includes functionality to execute algorithms 222 received from disparate access nodes 210 such that the algorithms 222 are executed efficiently.

In the environment of FIG. 2, access nodes 210 are any device that can access the functionality of the quantum cloud system 230. In some configurations, access nodes 210 are classical computing devices adapted to execute classical computer programs (e.g. access node 210A). A typical access node 210 can be a lap-top computer, tablet, or cell-phone, or any other client device. The access nodes 210 include software applications, such as application 212, which execute on the processor of the respective access node 210. In one example, the application 212 can be a programming application, such as a compiler and/or integrated development environment, configured to program quantum processing systems. Application 212 can generate an algorithm 222 for determining a result 224 of a quantum calculation on the quantum cloud system 230. Thus, access nodes 210 generate an algorithm 222 that uses quantum calculations in the context of classical application 212.

In various embodiments, applications 212 can be a web browser, a word processor, a networking application, a messaging application, etc. In some embodiments, each application 212 can be linked to a user account on the quantum cloud system 230 associated with an access node 210, an access node user, or group of access node users. Applications 212 of disparate access nodes 210 can communicate with one another and with quantum cloud system 230 (in some embodiments via the network 220).

In some cases, application 212 uses an application programming interface (API) 214 to communicate with the quantum cloud system 230 through the network 220. The API 214 can expose the application 212 to a quantum machine instruction library. The quantum machine instruction library may include, for example, calibration procedures, hardware tests, pre-generated algorithms, quantum gates, etc. The quantum machine instruction library can include a file structure, naming convention, or other system that allows the resources in the quantum machine instruction library to be invoked by algorithms 222. In some examples, the API 214 is configured to allow the application 212 to generate algorithms 222 that control both the classical processing system 400 and quantum processing system using the quantum machine instruction library.

Additionally, access nodes 210 can include an access node datastore 216. The access node datastore 216 contains information associated with the access node user, the access node 210, a user account, application 212, and application specific data (i.e., data and variables used by or related to algorithms 222). This information can be accessed by the application 212 when generating or transmitting an algorithm 222 to the quantum cloud system 230. In one embodiment, the information can be used to build, store, modify, or update user profiles. The information stored in the device datastore 216 can include: inter-node security metrics, intra-node security metrics, network security metrics, authentication protocols, user account information and preferences, access node information and preferences, access node user information and preferences, a record of preferences and changes, location based information, identities of applications or other application information executing on an access node, and any other information associated with executing algorithms 222 in the environment 200. In some embodiments, an access node can store a local copy of the quantum machine instruction library in device datastore 216.

Some access nodes 210, such as access nodes 210A and 210B, communicate with the quantum cloud system 230 via the network 220, which may include any combination of local area and wide area networks employing wired or wireless communication links. In some embodiments, all or some of the communication on the network 220 may be encrypted or subject to security settings within the environment. In some examples, an access node 210 (e.g., access node 210C) can be directly connected to and communicate directly with quantum cloud system 230. Herein, for convenience, an access node may be referred to as access node 210 and may refer to access node 210A, 210B, and/or 210C.

The quantum cloud system 230 receives, interprets, and executes algorithms 222 from an access node 210. In some examples, a user generates the algorithm 222 on an access node 210 and transmits the algorithm 222 to the quantum cloud system 230. After execution, the quantum cloud system transmits the result 224 of the algorithm 222 to the access node 210. In the example embodiment of FIG. 2, the quantum cloud system 230 includes a quantum processing system 300, a classical processing system 400, and a shared memory 240. The quantum processing system includes controllers 310, signal hardware 320, and a quantum processing cell 330.

The quantum cloud system 230 includes a number of systems and modules, which refers to hardware components and/or computational logic for providing the specified functionality. That is, a system or module can be implemented in hardware elements, firmware, and/or software (e.g., a hardware server comprising computational logic, or computer storage medium comprising computational logic). Other embodiments can include additional systems and modules, can distribute functionality between systems and modules, and can attribute functionality to more or fewer systems or modules. Note that, in general, quantum processing systems and modules require specialty quantum hardware systems as described herein. Further, some modules of the quantum cloud system 230 are designed for control of the specialty quantum hardware systems.

Quantum cloud system 230 includes a classical processing system 400. The classical processing system 400 is described in more detail in regard to FIG. 4. The classical processing system 400 receives an algorithm 222 from an access node 210. The compiler 410 inputs the algorithm 222 and parses the algorithm into a set of algorithm instructions. The compiler 410 then translates the algorithm instructions into code in a target language that, when executed by the quantum processing system 300, determine a result of the algorithm 222. The compiler 410 is configured to optimize the code such that, when executed by the quantum cloud system 230, the algorithm 222 executes efficiently. The compiler 410 is described in more detail in Section VII: Compiler. Example optimizations the compiler 410 implements when generating code in a target language are described in more detail in Section VIII: Example Optimizations. The quantum cloud system 230 executes the code generated by the compiler 410 to determine the result 224 of the algorithm 222 and returns the result 224 of the algorithm 222 to the access node 210. In one embodiment, the classical processing system 400 generates code in a target language based on the quantum instruction language (e.g., Quil) of the received algorithm and the quantum machine instruction library. Additionally, herein, executing quantum instructions and/or a quantum operations on the quantum processing system assumes that the classical processing system 400 generates the corresponding code in a target language to execute the instructions and/or operations.

Because the algorithm is executing on quantum cloud system 230, which includes both classical and quantum systems, the algorithm instructions can include both classical instructions and quantum instructions. Accordingly, the algorithm can be viewed as a hybrid classical/quantum algorithm. The classical instructions are instructions of the algorithm 222 that execute on the classical processing system 400. Similarly, the quantum instructions are instructions of the algorithm 222 that execute on the quantum processing system 300. In various configurations, the algorithm 222 can include only classical instructions or only quantum instructions.

Algorithm instructions can be scheduled for execution on the quantum processing system by the quantum cloud system 230 in a variety of manners. As a basic example, the classical processing system 400 may schedule two classical instructions on the classical processing system 400 and a single quantum instruction on the quantum processing system 300, followed by three classical instructions on the classical processing system 400, etc. In another embodiment, the classical processing system 400 directly schedules the quantum instructions on the quantum processing system 300. In another embodiment, executing a classical instruction initiates the scheduling and execution of a quantum instruction on the quantum processing system 300.

Further, scheduled algorithm instructions can be executed by the quantum cloud system 230 in a variety of manners. Using the previous example, the quantum cloud system 230 may execute the two classical instructions, then the quantum instruction, then the three classical instructions, etc. In some embodiments, the algorithm instructions are executed based on a system clock of the quantum cloud system (e.g., each instruction executes at a specific time). In another embodiment, the algorithm instructions execute sequentially (e.g., a first instruction, a second instruction, etc.). In another embodiment, the classical processing system 400 can schedule classical and quantum operations, or multiple quantum operations, to execute simultaneously on their respective systems. Further, the classical processing system 400 can schedule classical and quantum operations, or multiple operations, such that the quantum operations iteratively execute on the quantum processing system using a different value of a variable for each iteration.

Whatever the embodiment, the classical processing system 400 may schedule algorithm instructions in any manner across any of the systems and modules of the quantum cloud system 230 such that, when executed, the algorithm instructions determine the result 224 of the algorithm 222.

Quantum cloud system 230 includes a quantum processing system 300. The quantum processing system 300 is described in more detail with reference to FIG. 3. The quantum processing system 300 is configured to execute quantum operations to facilitate determining the result of an algorithm 222. For example, the quantum processing system 300 receives scheduled quantum instructions from the classical processing system 400 and executes the quantum instructions. In another example, the quantum processing system 300 receives and executes a quantum instruction as a result of the classical processing system 400 executing a classical instruction. In still another example, the quantum processing system 300 receives code in a target language from the classical processing system 400 and executes the code. Generally, the quantum processing system stores the result of the quantum computation in the shared memory 240. In some embodiments, the quantum processing system 300 returns the result of the quantum computation to the classical processing system 400.

The shared memory 240 stores information that can be used by any system or module of the quantum cloud system 230 to facilitate determining a result 224 of an algorithm 222. In a particular example, the shared memory 240 stores the result of quantum computations executed by the quantum processing system 300, which are then directly accessible by the classical processing system 400. As noted above, the algorithm instructions can include information stored in the shared memory 240 of the quantum cloud system 230. For example, the shared memory 240 can store a rotation angle as an input parameter that a machine instruction can access and apply to a qubit when executing. As another example, the shared memory 240 can store the results of two previously executed quantum operations which a classical instruction can multiply using the classical processing system 400.

Providing a more contextual example of the environment 200, consider a researcher working to understand the dynamics of protein folding in a biological environment. The researcher generates computer code modeling protein folding using an algorithm 222 including several classical and quantum calculations. The code is generated on a client device 210 using an application 112 with an installed API 214 configured to generate code using a quantum programming language, such as the Quil programming language. The researcher transmits the code to the quantum cloud system 230 via the network 220.

The quantum cloud system 230 receives the code at the classical processing system 400. The compiler 410 inputs the algorithm, generates a set of algorithm instructions, including both classical instructions and quantum instructions, based on the code. The compiler 410 then generates code in a target language for execution on the classical processing system 400. The compiler 410 may schedule the code such that the result of the code can be determined. For example, the classical processing system 400 schedules the classical operations on the classical processing system 400, and the remainder of the quantum operations on the quantum processing system 300. In this example, the quantum processing system 300 executes the generated code to execute the quantum operations and stores the result in the shared memory 240.

In aggregate, the algorithm instructions executed across the systems and modules of the quantum cloud system 230 determine a result 224 to the protein folding code. Once determined, the quantum cloud system 230 transmits the result to the client device 210 (in embodiments via the network 220). The researcher celebrates the computation and completion of such a complex problem.

III. Quantum Processing System

Figure 3:
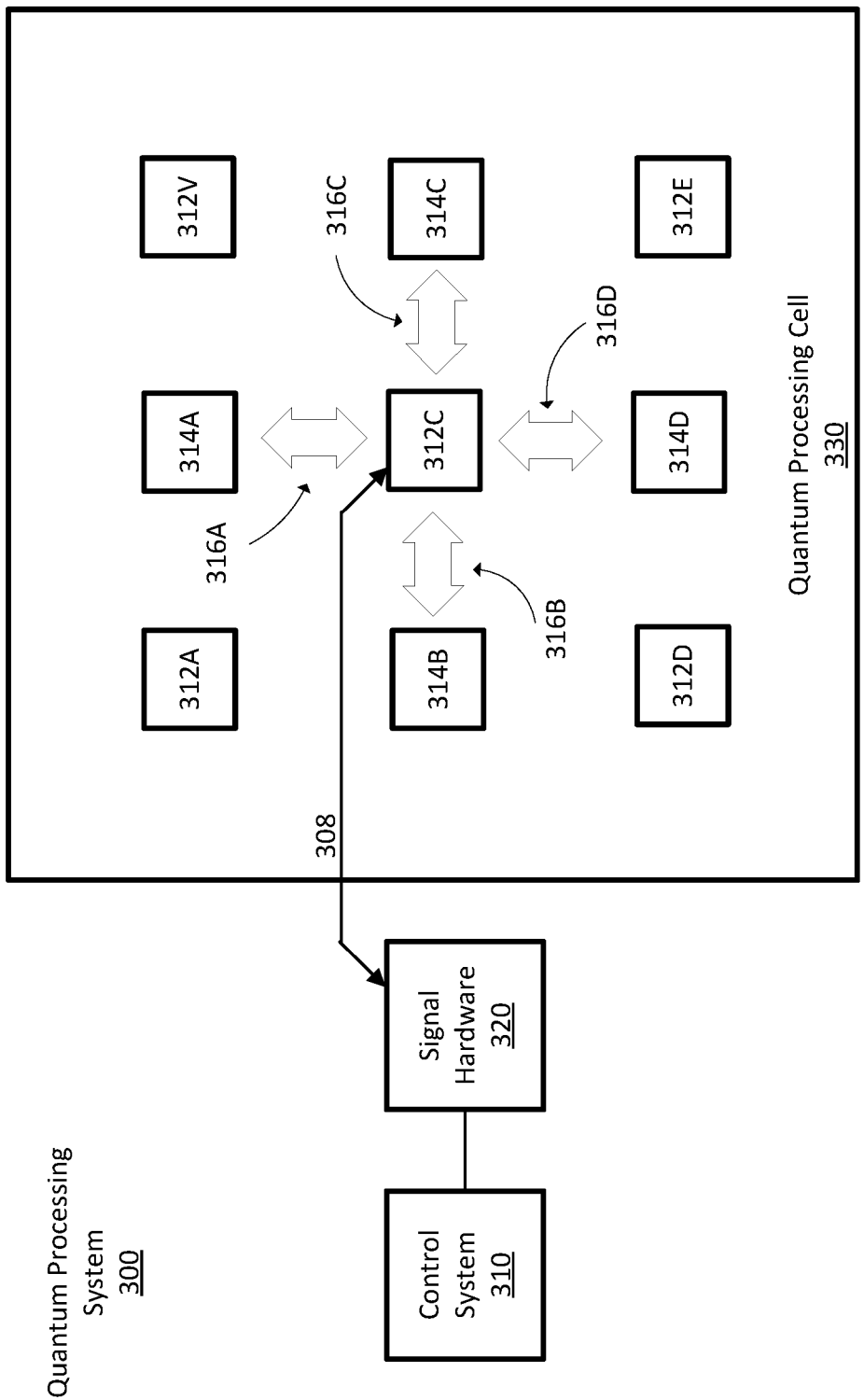
FIG. 3 is an illustration of a quantum processing system, according to one example embodiment.

FIG. 3 is a block diagram showing devices and interactions in an example quantum processing system 300 of the quantum cloud system 230. As shown in FIG. 3, the example quantum processing system 300 includes control system 310, signaling hardware 320, and a quantum processing cell 330. The quantum processing system 300 may include additional or different features, and the components may be arranged differently from the arrangement described herein.

The example quantum processing cell 330 includes a qubit device array, which includes qubit devices arranged in a two-dimensional or three-dimensional lattice structure. One or more qubits of the qubit device array in a quantum processing cell 330 may be referred to as a quantum processing sub-unit. In various other embodiments, the qubits may be arranged in any interconnected structure. Nine of the devices in the qubit device array are shown in FIG. 3. In particular, FIG. 3 shows five tunable qubit devices 312 and four other qubit devices 314. In some examples, the tunable qubit devices are implemented as tunable transmon qubit devices, flux qubit devices, flatsonium qubit devices, fluxonium qubit devices, or other types of tunable devices. In some examples, the other qubit devices 314 are also implemented as tunable qubit devices. In some examples, the other qubit devices 314 are implemented as fixed-frequency qubit devices. For instance, other qubit devices 314 may be implemented as fixed-frequency transmon devices or other types of fixed-frequency qubit devices. The devices shown in FIG. 3 may be implemented by other types of devices or components. As an example, one or more of the qubit devices shown in FIG. 3 may be implemented as a resonator device, a coupler device, or otherwise.

In some instances, all or part of the quantum processing cell 330 functions as a quantum processor, a quantum memory, or another type of subsystem. In some examples, the quantum processor includes a quantum circuit system. The quantum circuit system may include qubit devices, resonator devices and possibly other devices that are used to store and process quantum information. In some cases, the quantum processor includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor. In some cases, the quantum processor includes an ion trap system, and the qubit devices are implemented as trapped ions controlled by optical signals delivered to the quantum processor. In some cases, the quantum processor includes a spin system, and the qubit devices are implemented as nuclear or electron spins controlled by microwave or radio-frequency signals delivered to the quantum processor. The quantum processor may be implemented based on another physical modality of quantum computing. Furthermore, in some embodiments the quantum processor includes qudit devices.

In the example shown in FIG. 3, the devices are arranged in a rectilinear (e.g., rectangular or square) array that extends in two spatial dimensions, and each qubit device has up to four nearest-neighbor qubit devices. In some implementations, the devices can be arranged in another type of array (e.g., an ordered hexagonal array, an unordered random array, etc.). In some instances, the rectilinear array also extends in a third spatial dimension to form a cubic array or another type of three-dimensional array. In some configurations, a third spatial dimension can also include components configured for signal delivery. Signal delivery in the third dimension can allow non-adjacently located qubits to interact with. More broadly, the quantum processing cell 330 may include additional devices, including additional qubit devices, readout resonators, on chip parametric amplifiers, any type of interconnects, superconducting vias, etc.

In some implementations, the quantum processing cell 330 can process quantum information by applying control signals (e.g., signals 308) to the qubits (e.g., qubits 312 and 314) in the quantum processing cell 330. The control signals 308 can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform an algorithm 222. The algorithm 222 may correspond to a computational task, a hardware test, a quantum error correction procedure, a quantum state distillation procedure, or a combination of these and other types of operations.

Signal hardware 320 includes components that communicate with the quantum processing cell 330. The signal hardware 320 may include, for example, waveform generators, amplifiers, digitizers, high-frequency sources, DC sources, AC sources and other types of components. The signal hardware may include additional or different features and components. In the example shown, components of the signal hardware 320 are adapted to interact with the quantum processing cell 330. For example, the signal hardware 320 can be configured to operate in a particular frequency range, configured to generate and process signals in a particular format, or the hardware may be adapted in another manner.

In some instances, one or more components of the signal hardware 320 generate signals 308, for example, based on control information from control system 310. The signals can be delivered to the quantum processing cell 330 to operate the quantum processor system 300. For instance, the signal hardware 320 may generate signals 308 to implement quantum logic operations, readout operations or other types of operations. As an example, the signal hardware 320 may include arbitrary waveform generators (AWGs) that generate electromagnetic waveforms (e.g., microwave or radio-frequency) or laser systems that generate optical waveforms. The waveforms or other types of signals 308 generated by the signal hardware 320 can be delivered to devices in the quantum processing cell 330 to operate qubit devices, readout devices, bias devices, coupler devices or other types of components in the quantum processing cell 330.

In some instances, the signal hardware 320 receives and processes signals from the quantum processing cell 330. The received signals can be generated by operation of the quantum processing system 300. For instance, the signal hardware 320 may receive signals 308 from the devices in the quantum processing cell 330 in response to readout or other operations performed by the quantum processing cell 330. Signals 308 received from the quantum processing cell 330 can be mixed, digitized, filtered, or otherwise processed by the signal hardware 320 to extract information, and the information extracted can be provided to the control system 310 or handled in another manner. In some examples, the signal hardware 320 may include a digitizer that digitizes electromagnetic waveforms (e.g., microwave or radio-frequency) or optical signals, and a digitized waveform can be delivered to the control system 310 or to other signal hardware components. In some instances, the control system 310 processes the information from the signal hardware 320 and provides feedback to the signal hardware 320; based on the feedback, the signal hardware 320 can in turn generate new control signals that are delivered to the quantum processing cell 330.

In some implementations, the signal hardware 320 includes signal delivery hardware that interfaces with the quantum processing cell 330. For example, the signal hardware 320 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processing cell 330. In some instances, signal delivery hardware performs preprocessing, signal conditioning or other operations on readout signals received from the quantum processing cell 330.

Control system 310 communicates with the signal hardware 320 to control operation of the quantum processing system 300. The control system 310 may include digital computing hardware that directly interfaces with components of the signal hardware 320. In various embodiments, the control system can include features similar to classical processing system 400. That is, control system 310 may include processors, memory, clocks and other types of systems or subsystems.

Generally, the control system 310 can interpret the quantum instructions generated by classical processing system 400 and generate hardware-specific control sequences configured to execute the operations proscribed by the quantum instructions. For example, the control system 310 may generate control information that is delivered to the signal hardware 320 and converted to control signals that control the quantum processing cell 330.

Control system 310 can include one or more clocks that can assist in scheduling quantum operations. For example, operations performed by the control system 310 may be scheduled for execution over a series of clock cycles, and clock signals from one or more clocks can be used to control the relative timing of each operation or groups of operations. In some cases, the control system 310 schedules control operations according to code generated from an algorithm 222, and the control information is delivered to the signal hardware 320 according to the schedule in response to clock signals from a clock or other timing system.

In some embodiments, control system 310 can execute classical computer program instructions (e.g., instructions formatted as software, firmware, or otherwise). For example, the control system 310 may execute a quantum processing cell 330 (QPC) driver software, which may include machine code compiled from any type of programming language (e.g., Python, C++, etc.) or instructions in another format. In some cases, QPC driver software receives code (e.g., based on information from the quantum cloud system 230) and quantum state information (e.g., based on information from the signal hardware 320), and generates control signal and sequences for the quantum processing cell 330 based on the quantum instructions and quantum state information.

Control system 310 generates control information (e.g., a digital waveform) that is delivered to the signal hardware 320 and converted to control signals 308 (e.g., analog waveforms) for delivery to the quantum processing cell 330. The digital control information can be generated based on quantum instructions (or code in a target language), for example, to execute quantum logic operations, readout operations, or other types of control.

Control system 310 can extract qubit state information from qubit readout signals, for example, to identify the quantum states of qubits in the quantum processing cell 330 or for other purposes. For example, the control system 310 may receive the qubit readout signals (e.g., in the form of analog waveforms) from the signal hardware 320, digitize the qubit readout signals, and extract qubit state information from the digitized signals.

In some implementations, the quantum processing system 300 can span multiple different temperature and noise regimes. For example, the signaling hardware 320 can include a series of temperature stages (e.g., 60 K, 3 K, 350 mK, 300 mK, 5 mK) that decrease between a higher temperature regime of the control system 310 and a lower temperature regime of the quantum processing cell 330. The quantum processing cell 330, and in some cases all or part of the signaling hardware 320, can be maintained in a controlled cryogenic environment. In some examples, the cryogenic environment can be provided, by shielding equipment, cryogenic equipment, and other types of environmental control systems.

In some implementations, the tunable qubit devices 312 are housed between neighboring pairs of the other qubit devices 314 in a device array within the quantum processing cell 330. The quantum states of the respective qubit devices can be manipulated by control signals or read by readout signals generated by the control system 310 and signaling hardware 320. The qubit devices can be controlled individually, for example, by delivering control signals 308 to the respective qubit devices. In some cases, a neighboring pair of qubit devices (e.g., tunable qubit device 312C and other qubit device 314A) is controlled jointly by delivering control signals to the tunable qubit device. In some cases, readout devices can detect the states of the qubit devices, for example, by interacting directly with the respective qubit devices.

In the example shown in FIG. 3, each tunable qubit device 312 has one or more tunable transition frequencies. The transition frequency is the energy level between any two adjacent energy levels in a qubit device. The transition frequency of a qubit device is tunable, for example, by application of an offset field. In particular, the transition frequencies of the tunable qubit devices 312 can be tuned by applying an offset field to the tunable qubit device. The offset field can be, for example, a magnetic flux bias, a DC electrical voltage, AC electrical voltage or another type of field. In some implementations, the tunability of the tunable qubit devices 312 in the quantum processing cell 330 allows neighboring pairs of qubits to be selectively coupled on-demand to perform multi-qubit gates, to entangle neighboring pairs of qubits, or to perform other types of operations. The tunable qubit devices can have a high "on/off" ratio, which refers to the ratio of the effective coupling rate provided by control of the tunable qubit device. In one embodiment, each tunable qubit device can include a superconducting circuit loop including two Josephson junctions and a capacitor structure in parallel with the junctions.

In some implementations, the other qubit devices 314 are implemented as fixed frequency qubit devices. In one embodiment, a fixed frequency qubit device includes a Josephson junction connected in parallel with a capacitor structure. In this example, the transition frequency of a fixed-frequency qubit device is based in part on the Josephson energy of the junction. In some implementations, the coupling of a fixed-frequency qubit device with neighboring fixed-frequency qubit devices allows multi-qubit gate operations to be performed. In this implementation, the frequency of the qubit is not tunable with an offset field, and the qubit devices are less sensitive to low frequency flux noise, yielding improved longer coherence times.

IV. Quantum Computation

In the example quantum processing cell 330 each of the qubit devices can be encoded with a single bit of quantum information. As described with reference to FIG. 1, each of the qubit devices has two eigenstates that are used as basis states $|0\rangle$ and $|1\rangle$, and each qubit device can transition between the basis states or exist in an arbitrary superposition of the basis states. Generally, the two lowest energy levels (the ground state and first excited state) of each qubit device are defined as a qubit and used as basis states for quantum computation. In some examples, higher energy levels (e.g., a second excited state or a third excited state) are also defined by a qubit device and may be used for quantum computation in some instances.

In some instances, the information encoded in the qubit devices of the quantum processing cell 330 can be processed by operation of the tunable qubit devices 312. For instance, input information can be encoded in the computational states or computational subspaces defined by some of all of the qubit devices in the quantum processing cell 330. The information can be processed, for example, by applying an algorithm or other operations to the input information. The algorithm may be decomposed as gates or instruction sets that are performed by the qubit devices over a series of clock cycles. For instance, an algorithm may be executed by a combination of single-qubit gates and two-qubit gates. In some cases, information is processed in another manner. Processing the information encoded in the qubit devices can produce output information that can be extracted from the qubit devices. The output information can be extracted, for example, by performing state tomography or individual readout operations. In some instances, the output information is extracted over multiple clock cycles or in parallel with the processing operations. In some aspects of operation, the control system 310 sends control signals 308 to the tunable qubit devices in the quantum processing cell 330 using the signaling hardware 320. The control signals can be configured to modulate, increase, decrease, or otherwise manipulate the transition frequencies of the tunable qubit devices 312.

In the example shown in FIG. 3, the control system 310 sends control signals 308 to the tunable qubit device 312C to generate interactions between the tunable qubit device 312C and individual nearest neighbor qubit devices. In particular, the control signals 308 can generate a first interaction 316A between the tunable qubit device 312C and the other qubit device 314A, a second interaction 316B between the tunable qubit device 312C and the other qubit device 314B, a third interaction 316C between the tunable qubit device 312C and the other qubit device 314C, a fourth interaction 316D between the tunable qubit device 312C and the other qubit device 314D, or a combination of them in series or in parallel.

V. Quantum Gates

As described previously, an algorithm 222 may include a set of quantum instructions (e.g., computations) that can be executed by the quantum cloud system 230. Broadly, a quantum instruction can alter the state of a qubit, encode the state of a qubit, measure the state of a qubit, etc. Within the context of this description, a quantum computation (e.g., computations generated from an algorithm) is executed by applying a quantum gate to a qubit or qubits. Quantum gates are the building blocks of the algorithm and function similarly to logic gates in traditional computation systems and algorithms.

In practical terms, applying a quantum gate entails sending a specific set of signals to the control hardware of a qubit 312 which induces a change in the state of the qubit. In one example embodiment, the control signals are configured to generate interactions that apply quantum gates on the quantum states (e.g., change, measure, etc.) of one or more of the qubit devices. For example, referring to FIG. 3, one or more of the control signals 308 generates an interaction that applies a parametrically activated two-qubit quantum gate to a pair of qubits defined by the tunable qubit device 312C and one or more of the other qubit devices 314. The control signals 308 may activate quantum gates by modulating a transition frequency of the tunable qubit device 312C, for example, at a modulation frequency. For instance, the modulation of the transition frequency over a specified time period can produce the unitary evolution associated with the quantum gate.

Quantum gates can act on any number of qubits. For example, a "SWAP" quantum gate acts on two qubits and swaps the state information of the two qubits. Additionally, some two qubit gates are considered controlled gates. In controlled gates, the state of one of the qubits being acted upon acts as a control for the quantum operation. Controlled gates are generally used to generate entangled qubits.

As a practical example of a multi-qubit quantum gate, again referring to FIG. 3, the control system 310 sends control signals 308 to the tunable qubit device 312C via the signaling hardware to generate interactions between the tunable qubit device 312C and individual nearest neighbor qubit devices. In particular, the control signals 308 can generate a first interaction 316A between the tunable qubit device 312C and the other qubit device 314A, a second interaction 316B between the tunable qubit device 312C and the other qubit device 314B, a third interaction 316C between the tunable qubit device 312C and the other qubit device 314C, a fourth interaction 316D between the tunable qubit device 312C and the other qubit device 314D, or a combination of them in series or in parallel.

As previously described, quantum instructions (or code in a target language) generated from an algorithm 222 can include instructions to apply a quantum gate (or series of quantum gates) on the qubits of the quantum processor 300. In some configurations, the quantum instructions can include additional information to facilitate the application of a quantum gate to a qubit or qubits. Thus, the quantum instructions can be represented most generally by $G(k)=R$, where G is the executed quantum instruction (e.g., quantum gate(s)), k is a set of information (or parameters) associated with the quantum instruction to facilitate its execution, and R is the result of the quantum computation. In some configurations, the set of information k can include the location of the qubit on the quantum processor, timing instructions for the execution of the quantum computation, control signal information for applying the quantum gate, information from the shared memory for executing the quantum computation, etc. Additionally, in some configurations, the result R of the quantum computation can include changing the state of the qubit, changing the position of the qubit on the quantum processor, measuring the state of the qubit, maintaining the state of the qubit, resetting the qubit, etc.

VI. Classical Processing System

Figure 4:
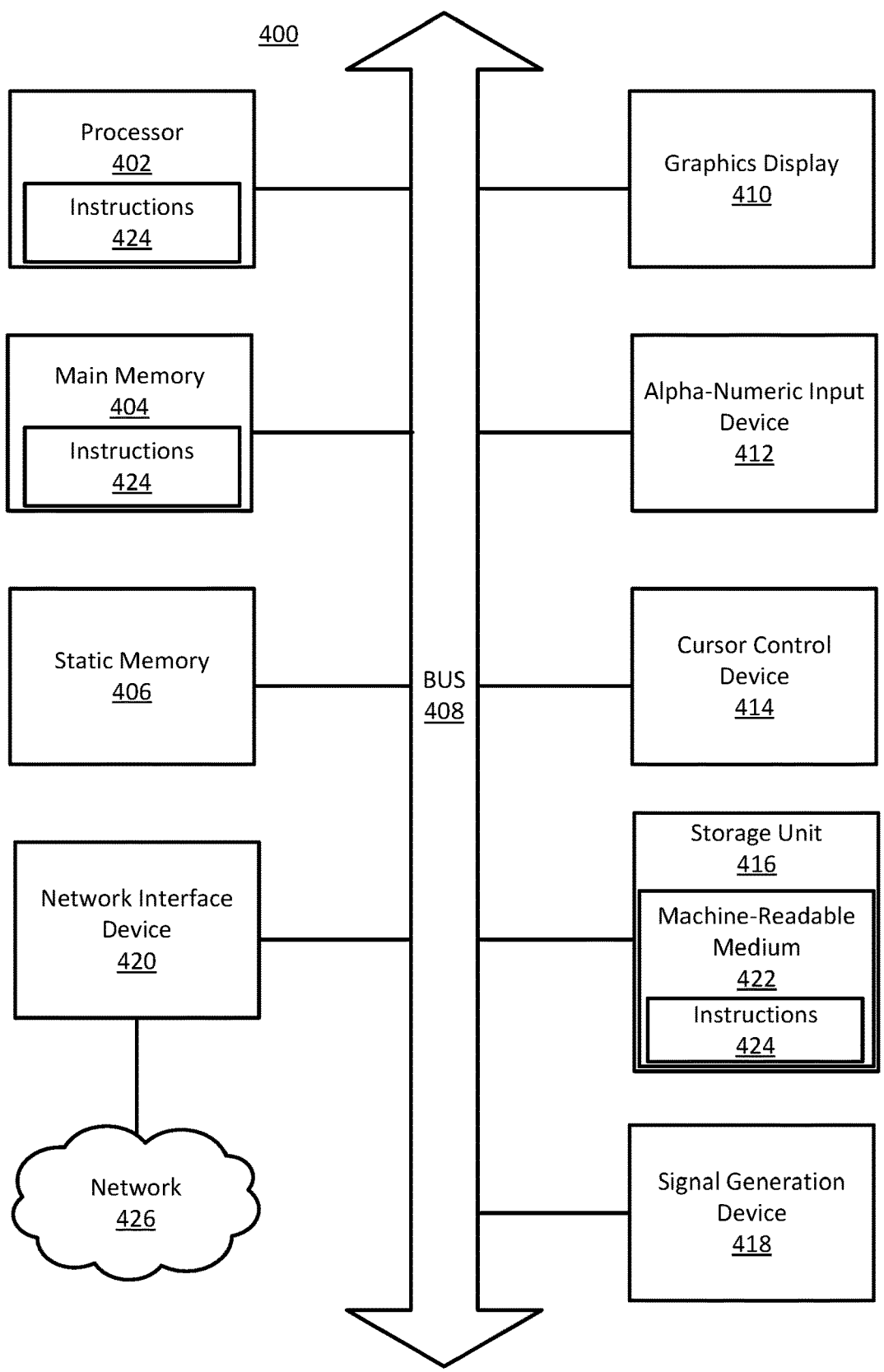
FIG. 4 is an illustration of a classical processing system, according to one example embodiment.

FIG. 4 is a block diagram illustrating components of an example classical processing system 400 that facilitates determining the result of an algorithm in the quantum cloud system of FIG. 2. Additionally, the classical processing system 400 is capable of reading and executing instructions from a machine-readable medium.

As an example, FIG. 4 shows a diagrammatic representation of the classical processing system 400 of FIG. 2. The classical processing system 400 can generate algorithm instructions using the classical processors 402. Further, the classical processing system 400 can be used to execute the classical instructions 424 of the algorithm instructions. In alternative embodiments, the classical processing system 400 operates as a standalone device or a connected (e.g., networked) device that connects to the network system. In the illustrated embodiment, the classical processing system 400 may be a server computer, capable of executing the classical instructions 424 (sequential or otherwise) that specify actions to be taken by the classical processing system 400 to determine the result of the algorithm.

The example classical processing system 400 includes one or more processing units (hereinafter referred to as processor 402). The processor 402 is, for example, a central processing unit (CPU), a graphics processing unit (GPU), a digital signal processor (DSP), a controller, a state machine, one or more application specific integrated circuits (ASICs), a field programmable gate array (FPGA), one or more radio-frequency integrated circuits (RFICs), or any combination of these. The processors 402 can generate control information, for example, based on the determined algorithm instructions (e.g., a set of quantum gates, offset field signals, quantum simulation parameters, etc.) to be performed by the quantum computing system 300.

The classical processing system 400 also includes a main memory 404. The computer system may include a storage unit 416. The processor 402, memory 404, and the storage unit 416 communicate via a bus 408. In addition, the computer processing system 400 can include a static memory 406.

The storage unit 416 includes a machine-readable medium 422 on which the classical instructions 424 embodying any one or more of the methodologies or functions described herein can be stored. For example, the classical instructions 424 may include the functionalities of modules and systems of the quantum cloud system 230 described in FIG. 2. The classical instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

In various embodiments, the memory systems can include, for example, a random access memory (RAM), a storage device (e.g., a writable read-only memory (ROM) or others), a hard disk, or another type of storage medium. The memory can include various forms of memory, media and memory devices, including by way of example semiconductor memory devices (e.g., EPROM, EE PROM, flash memory devices, and others), magnetic disks (e.g., internal hard disks, removable disks, and others), magneto optical disks, and CD ROM and DVD-ROM disks.

The classical processing system 400 may also include a graphics display 410 (e.g., to drive a plasma display panel (PDP), a liquid crystal display (LCD), or a projector), alphanumeric input device 412 (e.g., a keyboard), a cursor control device 414 (e.g., a mouse, a trackball, a joystick, a motion sensor, or other pointing instrument), and a network interface device 420, which also are configured to communicate via the bus 408.

The classical processing system includes a signal generation device 418. The signal generation device can include, radio frequency (RF) or microwave (µW) generators, radio frequency (RF) or microwave (µW) receivers, DC sources, or other types of radio frequency (RF) or microwave (µW) devices.

In these implementations, radio frequency (RF) or microwave (µW) generators and DC sources of the signal generation devices 418, can each generate control signals based on control information provided by the processors 402. The control signals can be delivered to the quantum processing system 300 by the signal generation devices 418, for example, and interact with circuit devices in the quantum processing cell 330. In some implementations, radio frequency (RF) or microwave (µW) receivers in the signaling hardware 418 can receive and process signals from the quantum processing cell 330. For example, receivers in the signaling hardware 418 can include a digitizer, a microwave source, and other types of signal processing components. The receivers of the signaling hardware 418 can process (e.g., digitize, or otherwise process) the signals from the quantum processing cell 330 and provide the processed information to the processors 402. The processors 402 can extract data to identify the quantum states of qubits in the quantum processing cell 330 or for other purposes.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but is not limited to, data repositories in the form of solid-state memories, optical media, and magnetic media.

In some instances, the classical processing system 400 operates based on a clock cycle or another type of synchronization scheme. For example, the synchronization scheme can be based on an algorithm or quantum processing task. The algorithm or quantum processing task may be expressed as a sequence of instructions corresponding to quantum gates, readouts, or other operations on the qubit devices, and a subset of the instructions can be executed on each clock cycle. In some instances, on each clock cycle the classical processing system 400 generates control signals to implement a subset of instructions, control signals are delivered to the quantum computation system 300, and qubit readout signals are delivered to the classical processing system 400. The control signals delivered on each clock cycle can be configured, for example, based on the sequence of instructions, based on readout signals from a previous cycle, quantum error correction operations, error matching calculations, other information, or a combination of these.

In some embodiments, client devices may be similarly configured to the classical processing system 400. That is, the client devices can include any elements of the classical processing system, or any additional element, such that the client devices are able to send algorithms or instructions to the quantum cloud system and receive the results of algorithms in response.

VII. Compiler

Figure 5A:
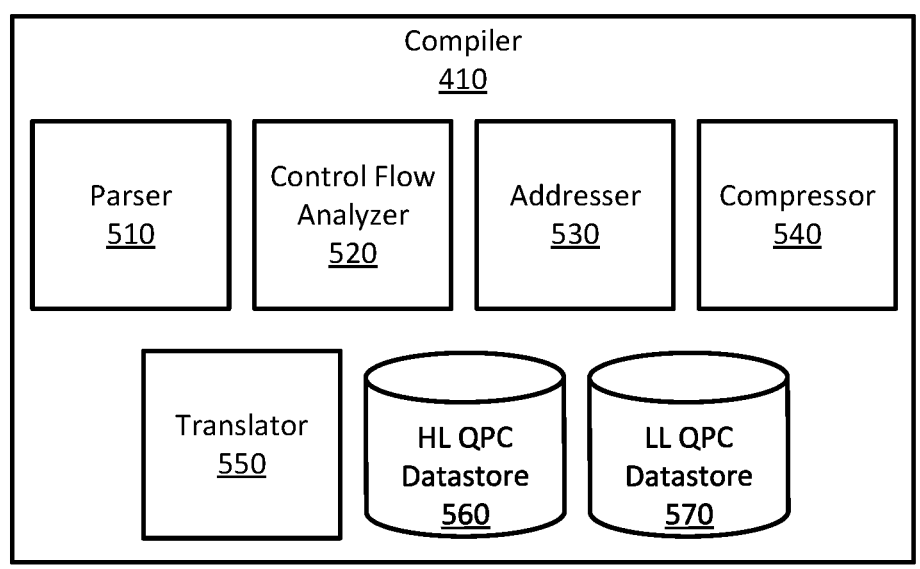
FIG. 5A is an illustration of a compiler for a quantum cloud system, according to one example embodiment.

FIG. 5A is an illustration of a compiler 410, according to one example embodiment. The compiler 410 receives an algorithm 222 and generates code in a target language for the quantum processing system 300 that implements the algorithm. The code, when executed by the quantum processing system 300, determines a result 224 of the algorithm 222. In this example, the compiler 410 includes several modules, including, for example, a parser 510, a control flow analyzer 520, an addresser 530, a compressor 540, and a translator 550. The compiler also includes a high-level quantum processing cell ("HL QPC") datastore 560, and a low-level quantum processing cell ("LL QPC") datastore 570. In some examples, the HL QPC datastore 560 and LL QPC datastore 570 are partitions of the shared datastore 240. In various embodiments the compiler 410 may have additional or fewer modules, and the functionality of a module may be distributed between one or more other modules of the compiler. The described functionality and their associated modules may be embodied in software, firmware, hardware, or any combinations thereof. Some alternative examples are provided in Section IX: Example Compiler Implementations.

Figure 5B:
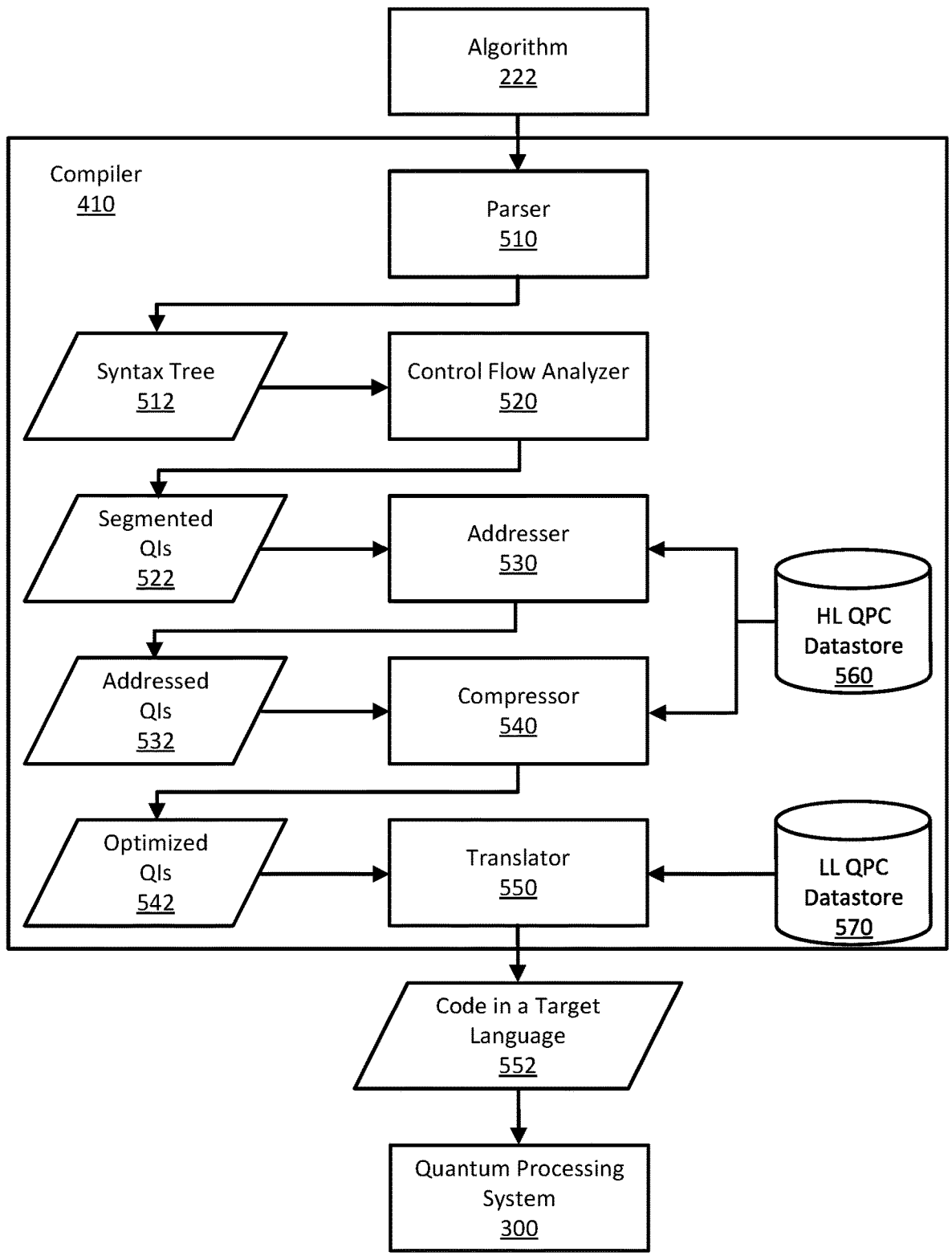
FIG. 5B is an illustration of a workflow for a compiler of a quantum cloud system for generating code in a target language from an algorithm, according to one example embodiment.

FIG. 5B is an illustration of a workflow executed by the compiler 410, in one example embodiment. Within the workflow, the compiler 410 inputs an algorithm 222 and outputs code 552 in a target language for a quantum processing system 300. The code 552 determines a result 224 of the algorithm 222 when executed by the quantum processing system 300.

The algorithm 222 is input into a parser 510, and the parser 510 outputs an abstract syntax tree 512 ("syntax tree"). The syntax tree 512 is a representation of structurally valid classical instructions and quantum instructions included in the algorithm. The parser 510 is described in more detail in Section VII.A: Parser.

A syntax tree 512 is input into a control flow analyzer 520, and the control flow analyzer 520 outputs segmented quantum instructions 522. Segmented quantum instructions are segments of the syntax tree 512 consisting of solely quantum instructions (i.e., no classical instructions). The control flow analyzer 520 is described in more detail in Section VII.B: Control Flow Analyzer.

Segmented quantum instructions 522 are input into the addresser 530, and the addresser 530 outputs addressed quantum instructions 532. Addressed quantum instructions 532 are quantum instructions that are executable by one or more quantum processing cells 330 of the quantum processing system 300. That is, a control system 310, signal hardware 320, and qubits 312 can execute addressed quantum instructions on a quantum processing cell. The addresser 530 can use information stored in the HL QPU datastore 560 (e.g., connectivity, lifetimes, etc.) to generate addressed quantum instructions 532. The addresser 530 is described in more detail in Section VII.C: Addresser.

Addressed quantum instructions 532 are input into the compressor 540, and the compressor 540 outputs optimized quantum instructions 542. Optimized quantum instructions 542 are addressed quantum instructions 532 that are processed to produce semantically equivalent quantum instruction sequences that are more efficient. That is, the compressor 540 analyzes the addressed quantum instructions 532 and determines sequences of quantum instructions that can be implemented more efficiently without changing the result 224 of the algorithm 222. Efficiency, here, can be any measure of improvement over the input addressed quantum instructions 532. For example, efficiency can be a measure of overall length, number of instructions, execution time, processing time, etc. The compressor 540 can use information stored in the HL QPU datastore 560 to generate optimized quantum instructions 542. The compressor 540 is described in more detail in Section VII.D: Compressor.

The optimized quantum instructions 542 are input into the translator 550, and the translator 550 outputs code 552 in a target language. Code 552 includes instructions executable by the quantum processing cell 330 to which the addressed quantum instructions 532 are addressed. In one example, the code 552 includes wave form descriptors for use as input to the controllers 310 and/or signal hardware 320 for the quantum processing cells 330. Other examples of code 552 are possible depending on the configuration of the quantum processing system 300. The translator 550 may use information stored in the LL QPU 570 to generate code 552. The translator 550 is described in more detail in Section VII.E Translator.

The HL QPC datastore 560 is a storage device storing non-volatile information describing the quantum processing system 300. That is, the information in the HL QPC datastore 560 is updated with low frequency. Information stored in the HL QPC datastore may include, for example, connectivity of qubits, operations executable by a qubit, lifetimes of information in a qubit, quantum processing cell 330 layouts, etc.

The LL QPC datastore 570 is a storage device storing volatile information describing the quantum processing system 300. That is, the information in the LL QPC datastore 570 is updated with high frequency. Information stored in the LL QPC datastore 570 may include, for example, pulse settings, calibration settings, etc.

VII.A Parser

The parser 510 inputs an algorithm 222 and outputs a syntax tree 512. The syntax tree 512 is a data structure suitable for further analysis by the compiler 410. More specifically, the parser 510 analyzes an algorithm 222 to determine structural validity of the algorithm 222 and stores the algorithm 222 in a syntax tree 512.

To illustrate, consider an algorithm 222 that includes a quantum instruction "H 0". Here, the algorithm 222 includes a single quantum instruction and does not include a classical instruction. In various examples, the algorithm 222 may include any number of classical and quantum instructions. The quantum instruction "H 0" is initially represented as a string in the algorithm 222. The parser 510 inputs the string and processes the string into a gate-application object. The gate application object is tagged with an operator name "H" and with a number "0". The operator name describes the type of quantum operation that will be executed by the quantum processing cell 330 and the number describes which qubit 312 of the quantum processing cell 330 the operation acts on. Other examples of parsing an algorithm 222 are possible.

VII.B Control Flow Analyzer

The control flow analyzer 520 inputs a syntax tree 512 and outputs segmented quantum instructions 522. Segmented quantum instructions 522 are segments of the syntax tree 512 consisting of solely quantum instructions (i.e., no classical instructions). More particularly, control flow analyzer 520 determines where allowable hybrid classical/quantum interactions occur in the syntax tree 512 and generates segmented quantum instructions 522 based on the determination. In segmented quantum instructions 522, the allowable interactions happen at the beginning and end of each segment (i.e., classical instructions bookend the quantum instructions of a segment). The control flow analyzer 520 can also analyze possible execution paths of the segmented quantum instructions 522 and discard any unused segment(s) (i.e., segments not executed by the quantum processor 300).

As an example, the parser 510 generates a syntax tree 512 from an algorithm 222. The syntax tree 512 includes both classical instructions and quantum instructions because the algorithm 222 is a hybrid algorithm. The control flow analyzer 520 inputs the syntax tree 512 and divides the syntax tree into segments. Each segment is bookended by classical instructions such as, for example, a jump target at the beginning of the segment and a jump (conditional or unconditional) at the end of the segment. In some examples, the control flow analyzer 520 may insert a jump target directly after a classical instruction such that the next segment can begin. Similarly, in some examples, the control flow analyzer 520 may insert an unconditional jump before the target if the target refers to separate labels or locations. In whichever case, the jumps divide the algorithm 222 into segmented classical instructions and segmented quantum instructions 522. The control flow analyzer 520 arranges the segmented quantum instructions 522 into a call graph. The call graph is a data structure that allows the control flow analyzer 520 to analyze the control flow of the segmented quantum instructions 522.

The control flow analyzer 520 analyzes the control flow of segmented quantum instructions 522 in the call graph using a variety of methods, including, for example, edge contraction, dead code elimination and circuit expansion.

In edge contraction, the control flow analyzer 520 identifies a segment A and a segment B connected by a jump from segment A to segment B. In such case, segment A has only one exiting jump and segment B has only one arriving jump. Thus, there is only a single executable path from the beginning of segment A to the end of segment B. Accordingly, the control flow analyzer 520 merges segment A and segment B and eliminates the jump from A to B. Eliminating jumps greatly decreases execution times because jumps require coordination with classical processing system 400 and are therefore expensive instructions to execute.

In dead code elimination, the control flow analyzer 520 identifies a segment with no arriving jumps. A segment with no arriving jumps will not be executed when executing the algorithm 222 and, as such, the control flow analyzer 520 deletes the segment. While eliminating an unused segment may not directly affect the runtime of an algorithm 222, the elimination does affect the structure of the call graph representing a syntax tree 512. Thus, eliminating the segment affects which optimizations (such as edge contraction) can be performed. Further, eliminating the segments also reduces the amount of code that the compiler 410 must inspect and reduces compilation times.

In circuit expansion, the control flow analyzer 520 identifies circuits that may expanded when executing a segment. A circuit is a block of quantum instructions that do not include classical instructions and may be called, and then expanded, by other segments of quantum instructions. Circuit expansion allows for segmented instructions to perform recursive insertion of quantum instructions. For example, a segment may include a quantum instruction that calls a circuit. The control flow analyzer 520 expands the circuit by inserting the quantum instructions of the circuit into the calling segment. Alternatively, the control flow analyzer 520 inserts a jump to the circuit and a return from the circuit.

Circuit expansion allows a single block of quantum instructions to be analyzed by the control flow analyzer 520 one time rather than many times which may reduce the compilation time of a hybrid algorithm 222.

VII.C Addresser

The addresser 530 inputs segmented quantum instructions 522 and outputs addressed quantum instructions 532. Addressed quantum instructions 532 are quantum instructions that may be executed by a quantum processing cell 330 of the quantum processing system 300. More particularly, addressed quantum instructions 532 are assigned to a particular quantum processing cell 330 and are executable by the particular quantum processing cell 330 to which they are assigned. Generally, the addressed quantum instructions 532 are native quantum instructions of the quantum processing cell 330 to which they are assigned.

The addresser 530 generates addressed quantum instructions 532 mapped to qubits 312 of a quantum processing unit 330 of the quantum processing system 300. That is, the addresser 530 inputs segmented quantum instructions 522 specified in terms of a logical address (i.e., an abstracted representative address) and outputs addressed quantum instructions 532 registered to a quantum processing cell 330 and its constituent qubit(s) 312. Here, a logical address is an abstracted representative address that allows an author of an algorithm 222 to generate instructions for information that resides in a representative location not associated with a specific physical location. For example, an instruction can act on information having a logical address "register 36" without knowledge of the register's corresponding physical location. The addresser 530 physically maps the information in a logical address to a physical location. For example, the addresser 530 maps the information in "register 36" to, for example, qubit 312A of a quantum processing cell 330.

The physical location of the qubit 312 executing quantum instructions is important in the execution of an algorithm 222. For example, an algorithm 222 may include a quantum operation requiring two qubits 312 to be physically adjacent to one another on a quantum processing cell 330. In some cases, the qubits 312 are not physically adjacent and the quantum processing cell 330 cannot perform the quantum operation. As such, the algorithm 322 may necessitate quantum instructions for moving information between physical locations such that they are adjacent and the quantum operation may be performed. In these situations, the addresser 530 may generate quantum instructions that move information from one physical location to another physical location ("swapping instructions") to include in addressed quantum instructions 532. Swapping instructions allows an algorithm 222 to be executed by appropriately moving information across a quantum processing cell 330. For example, the addresser 510 may generate addressed quantum instructions 532 including swapping instructions for moving information in qubit 312A to qubit 312E such that the information is adjacent to qubit 312D and a quantum operation may be performed. Swapping instructions are important in determining how efficiently quantum instructions execute on a quantum processing cell 330.

The addresser 530 may determine which quantum processing cell 330 of the quantum processing system 300 executes a particular set of segmented quantum instructions 522 most efficiently. For example, the addresser 530 may calculate an amount of time to execute the particular set of quantum instructions on each quantum processing cell 330 of a quantum processing system 300. In this case, the addresser 530 may generate, for each quantum processing cell 330, addressed quantum instructions 532 including the necessary swapping instructions to execute the segmented quantum instructions 522 on that quantum processing cell 530. The addresser 530 estimates the amount of time required to execute the generated addressed quantum instructions 532 on each quantum processing cell 330. Subsequently, the addresser 530 determines that a particular quantum processing cell 330 executes the particular set of segmented quantum instructions 522 most efficiently and, as such, the addresser 530 generates addressed quantum instructions 532 addressed to that particular quantum processing cell 330 (rather than the other quantum processing cells 330). In this manner, the addresser 530 continuously generates addressed quantum instructions 532 for the quantum processing cells 330 that most efficiently execute a set of segmented quantum instructions 522. Efficiency can be measured in a number of manners as previously described.

The aforementioned process for determining which quantum processing cell 330 to execute a particular set of quantum instructions also occurs when selecting qubits 312 to execute quantum instructions on a quantum processing cell 330. That is, the addresser 530 may determine which qubits 312 of a quantum processing cell 330 execute quantum instructions most efficiently and generate addressed quantum instructions using those qubits 312.

The addresser 530 can generate swapping instructions that can be executed concurrently with other quantum instructions when generating addressed quantum instructions 532. For example, if a quantum processing cell 330 is executing an operation on a particular qubit 312, the quantum processing cell 330 concurrently executes swapping instructions to move the information stored in a different qubit 312. The swapping instructions migrate data such that by the time a quantum instruction has completed execution on a piece of data, the next piece(s) of data are located on the quantum processing cell 330 such that they may be acted upon.

The addresser 530 generates swapping instructions that can be executed at "no cost" when possible. That is, the addresser 530 generates swapping instructions that may be performed at the level of a controller 310 rather than the quantum processing cell 330. Take, for example, addressed quantum instructions 532 including quantum instructions "CZ 0 1", "CZ 1 2", "CZ 0 2" to be compiled. In this example, addresser may relabel the registers 0 and 1 for a controller 310, such that "CZ 0 2" is relabeled "CZ 1 2" and, correspondingly, other operations that take place on the logical addresses 0 and 1 are transposed on the physical device. In this manner, fewer swapping instructions that move information across a quantum processing cell 330 are necessary.

The addresser 530 can generate addressed quantum instructions 532 in a native instruction set of the particular quantum processing cell 330 to which the addressed quantum instructions 322 are mapped. For example, in an embodiment, once the addresser 530 assigns quantum instructions to physical hardware addresses (e.g., qubits 312) of a particular quantum processing cell 330, the addresser 530 ensures that the quantum instructions are native quantum instructions of the quantum processing cell 330 to which they are assigned. In this manner, the addresser 530 may generate a realizable sequence of quantum instructions for any quantum instruction in a set of segmented quantum instructions 522. In some embodiments, generating quantum instructions based on the quantum processing cell 330 to which they are assigned is done in tandem with the assignment. In tandem processing allows the addresser 530 to more accurately estimate the duration of a given quantum instruction, and, thereby, influence the layout of instructions further along in the input sequence.

The addresser 530 may use information stored in the HL QPC datastore 560 when generating addressed quantum instructions 532. For example, in one embodiment, the addresser 530 may access an information set for each quantum processing unit 330 when generating addressed quantum instructions 532. The information set can include, for example, a user-specified, or machine detected, description of the quantum processing system 300 hardware. That is, the information set may include, for example, a list of the hardware components of the quantum processing cell 330 and their connectivity. Further, the information set can include information about the native instruction set and native instruction set timing for the quantum processing cell 330. The information set can include any other additional information describing the quantum processing system 300 (as described herein) that the compiler 410 can use to generate code 552 in a target language.

The addresser 530 can generate addressed quantum instructions 532 for any hardware component that has a translation routine included in an information set. For example, translation routines may include, but are not limited to, two qubit gates "CZ", and "ISWAP", and one qubit gates "RX", "RY", and "RZ". In an example, the addresser 530 accesses an information set for a quantum processing unit from the HL QPC 560 datastore that indicates that a quantum processing cell includes "CZ" and/or "ISWAP" gates. In this case, the addresser 530 generates mathematically optimal addressed quantum instructions 532 that will be the shortest possible duration addressed quantum instructions 532 for a quantum processing cell 530 including these gates.

The information set may also include user-specified addressed quantum instructions that are preferred over optimized quantum instructions. For example, the addresser 530 may access an information set indicating that a particular sequence of quantum instructions is optimized. In this case, the addresser 530 generates addressed quantum instructions 532 that are not further optimized by the compressor 540. That is, as indicated by the information set, the addressed quantum instructions 532 are optimized quantum instructions.

The addresser 530 may use a cost function when determining a layout of information on a quantum processing cell 330. That is, when segmented quantum instructions 522 are input into the addresser 530 and assigned to qubits 312 on a quantum processing cell 330, the layout may be scored according to the cost function. The score is a measure of "badness" for the layout of information in the qubits 312 of a quantum processing cells 330. For example, a layout requiring a large number of swapping instructions to move information across the quantum processing cell 330 may have a higher badness score than a layout requiring a small number of swapping instructions to move information across the quantum processing cell 300. More generally, gate infidelity, readout infidelity, relaxation time, usage frequencies of particular qubits through the course of an algorithm, and compiled circuit depth may all contribute to the badness score to varying degrees. If the badness score is above a threshold score the addresser 530 may assign the information to different qubits 312 on the quantum processing cell 530 to decrease the score. The cost function may be generated by an administrator of the quantum cloud system 200 or may be programmable by a user of the quantum cloud system 200.

The addresser 530 may also emulate pseudo-devices when generating addressed quantum instructions 532. Pseudo-devices are simulated hardware components that indirectly connect two qubit devices. Pseudo-devices may also be simulated hardware components that act on many qubits simultaneously even though each pair of qubits is only indirectly connected by qubit-pair devices. The addresser 530 may use several pseudo-device techniques when generating addressed quantum instructions, such as, for example, Cosine-Sine Compilation (see, for example, "Synthesis of Quantum Logic Circuits" by Shende et. al., IEEE Transactions on Computer Aided Design of Integrated Circuits and Systems, June 2006), Quantum Shannon Compilation (see, for example, (see, for example, "Synthesis of Quantum Logic Circuits" by Shende et. al., IEEE Transactions on Computer Aided Design of Integrated Circuits and Systems, June 2006) coupled to a variety of special-case routines such as, for example, Uniformly Controlled Roll Compilation (see, for example, "Quantum Circuits with Uniformly Controlled One-Qubit Gates" by Berholm et. al., Physical Reviews A, May 2005).

The addresser 530 can generate addressed quantum instructions 532 that execute on more than a pair of qubits 312 simultaneously. That is, for example, the addresser 530 may generate addressed quantum instructions 532 that move information such that three qubits 312 are adjacent on a quantum processing cell 330 and execute quantum operations using all three of the qubits 312 simultaneously. Other numbers of qubits are possible.

Most generally, the addresser 530 generates addressed quantum instructions 532 that are suitable for realization on a quantum processing system 300. The addressed quantum instructions 532 include an assignment of segmented quantum instructions 522 from logical addresses to physical addresses on a quantum processing cell 330. That is, the addressed quantum instructions 532 include information describing where an algorithm 222 input is located (physically) on a quantum processing cell 330 at the beginning of the algorithm execution. Additionally, addressed quantum instructions 532 include information describing where a result of quantum operations reside (physically) on a quantum processing cell 330 such that the result 224 may be measured.

The addressing procedure is programmable by an architect or administrator of the quantum cloud system 200. For example, as the architect implements different quantum processing cells 330 on the quantum processing system 300, the addresser 530 may generate assigned quantum instructions 532 reflecting the layout and native gate sets for those quantum processing cells 330. The addresser 530 can compare the expected execution of addressed quantum instructions 532 on different quantum processing cells 530 when generating addressed quantum instructions 532. The addresser 530 assigns the addressed quantum instructions 532 to the quantum processing cell 330 that executes the addressed quantum instructions most efficiently.

Figure 6:
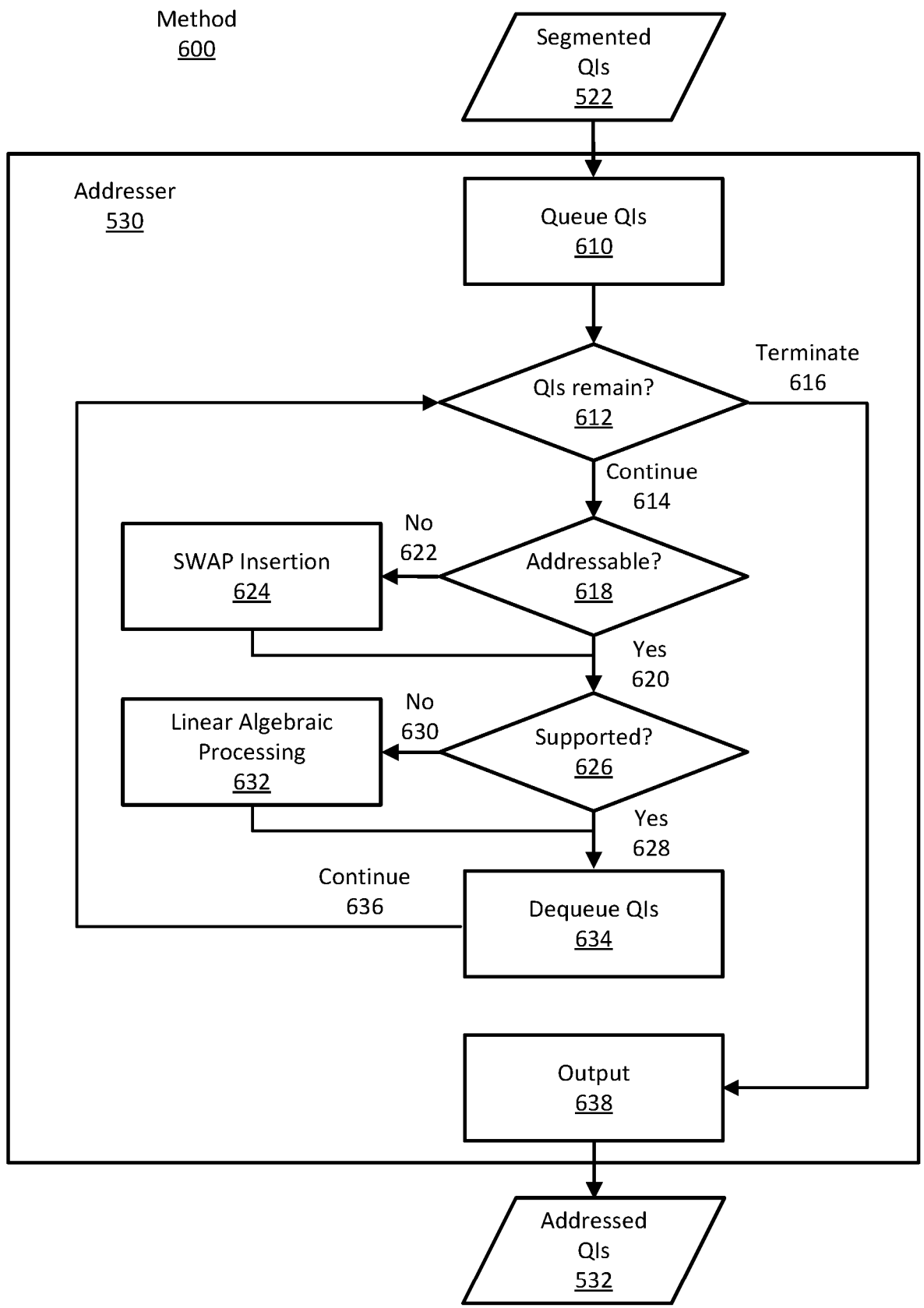
FIG. 6 is a flow diagram of a method implemented by an addresser to generate addressed quantum instructions from segmented quantum instructions, according to one example embodiment.

FIG. 6 is a flow chart of an example method for generating addressed quantum instructions 532, according to one example embodiment. Method 600 may be implemented using the addresser 530 of the compiler 410. The steps of method 600 may include additional or fewer steps and the steps may be executed in another order.

The addresser 530 inputs segmented quantum instructions 522. The segmented quantum instructions 522 include an initial mapping from logical locations to physical qubits ("qubit map"). Generally, the addresser 530 takes a qubit assigned to a logical location n to a physical qubit n, but could use any other mapping. The segmented quantum instructions also include a system of timeline objects for each qubit 312 and/or quantum processing cell 330 to keep track of when the hardware elements are in use when executing quantum instructions of a hybrid algorithm. The timeline may also be associated with the qubit map.

The addresser 530 queues 610 the segmented quantum instructions 522 for addressing to hardware components of a quantum processing system 300. The queued quantum instructions reflect a logical schedule for the quantum instructions. That is, the queued quantum instructions may be held in a data structure ("input schedule") allowing the addresser to address the quantum instructions. For example, an input schedule may include:

| | |
|---|---|
| CZ | 0 1 |
| X | 1 |
| CZ | 2 3 |
| CZ | 1 3 |

In this example, the instructions "CZ 0 1" and "CZ 2 3" are quantum instructions that may be addressed by the addresser 530. The quantum instruction "X 1" cannot be addressed because the instruction is blocked by "CZ 0 1". The quantum instruction is blocked because "CZ 0 1" and "X 1" share the qubit 1. Similarly, "CZ 1 3" is blocked by "X 1" and "CZ 2 3" because they share qubits 1 and 3.

The addresser 530 begins to dequeue quantum instructions if quantum instructions remain 612 on the input schedule. To do so, the addresser 530 analyzes the quantum instruction at the beginning of the input schedule. The addresser 530 dequeues the quantum instruction if it is both addressable and supported by the hardware of the quantum processing cell to which it is assigned ("supported"). When a quantum instruction is dequeued it is removed from the input schedule and the next quantum instruction on the input schedule is analyzed. The addresser 530 continues 614 to dequeue quantum instructions if quantum instructions remain on the input schedule. The addresser 530 terminates 616 dequeuing instructions if no quantum instructions remain on the input schedule. This dequeuing process is repeated as many times as possible. Once no quantum instructions remain on the input schedule the addresser 530 outputs 638 addressed quantum instructions 532.

The addresser 530 determines 618 if a quantum instruction is addressable to a qubit 312 of a quantum processing cell 330 based on the qubit map. For example, the addresser 530 can determine which qubits 312 of a quantum processing cell 330 are capable and/or available to execute the quantum instruction based on the qubit map. If the quantum instruction is addressable 620, the method 600 continues. If the quantum instruction is not addressable 622, the addresser considers a SWAP insertion 624 (i.e., generating swapping instructions).

When considering a SWAP insertion 624, the addresser 530 considers how the application of a number of single transpositions (e.g., SWAPs) to the current qubit map affects the cost function. The addresser 530 may select one or more transpositions that simultaneously lower the cost function while increasing the run-time of the hybrid algorithm by the least amount. The cost function, as previously described, can be a measure of many aspects of executing an algorithm. Here, the cost function is a measure of how distant quantum instructions are from the appropriate addressable qubit. That is, the cost function is a measure of a number of swapping instructions necessary for the quantum instruction to be addressed to a qubit appropriately. Once a transposition is selected and executed, the qubit map is updated to reflect the physical location of information in qubits after the swap insertion. The addresser 530 continues by determining if the quantum instruction is supported by hardware.

The addresser 530 determines 626 if a quantum instruction is supported using information stored in an information set in the HL QPC datastore 560. For example, the addresser 530 can determine if qubits 312 on the quantum processing cell 330 to which the quantum instruction is assigned are able to execute the quantum instruction. If the quantum instruction is supported 628, the method 600 continues.

If a quantum instruction is not supported 630, the addresser 530 performs linear algebraic processing ("LAP") 632 on the quantum instruction. LAP 632 converts the unsupported quantum instruction to a quantum instruction (or instructions) that can be executed by a qubit or qubits 312 of the quantum processing cell 330 to which it is assigned. That is, the addresser 530 converts the unsupported quantum instruction into a supported quantum instruction(s) (i.e., native instructions). Linear algebraic processing is described in more detail below. The converted instructions do not affect the result of the algorithm, but may increase the time it takes to execute the algorithm. In some cases, the addresser 510 may need to determine that the converted instructions are addressable before dequeuing them.

As previously described, the addresser 530 dequeues 634 a quantum instruction if it is both addressable and supported. Dequeued quantum instructions are stored in a data structure representing a physically parallelized schedule ("parallel schedule"). That is, the parallel schedule includes a schedule of quantum instructions to execute on each qubit 312 of a quantum processing cell 330 in parallel. Notably, the input schedule is not physically parallelized.

The addresser 530 can dequeue 634 quantum instructions based on the type of quantum instruction being dequeued. For example, the addresser 530 may dequeue a quantum instruction based on the number of qubits it acts on, the type of quantum operation being performed, the physical location of the qubit, etc. For example, quantum instructions acting on two qubits ("paired qubit instructions") are qualitatively different from quantum instructions acting on one qubit ("single qubit instructions"). Paired qubit instructions may take, for example, 10-20 times as long to execute on a quantum processing cell 330, and they are subject to the topological considerations described above. Single qubit instructions can be addressed to qubits for any qubit map. Accordingly, the addresser 530 prioritizes dequeuing paired qubit instructions earlier than single qubit instructions. That is, paired qubit instructions are prioritized for execution in the parallel schedule over single qubit instructions.

In some cases, the addresser 530 uses specific rules when dequeuing quantum instructions. For example, if the dequeued quantum instruction is "SWAP", "A SWAP", or some other transposition, the compiler 530 schedules the quantum instruction at the first available time to the parallel schedule. In another example, if the dequeued quantum instruction is a single qubit instruction, the compiler queues the single qubit instruction into a secondary waiting area for single qubit instructions. The single qubit instructions are indexed by logical address in the secondary waiting area, and actual dequeuing to the parallel schedule is deferred such that paired qubit instructions are dequeued first. In another example, if the dequeued quantum instruction is a paired qubit instruction, the single qubit instructions for the logical addresses of the paired qubit instruction are flushed to the parallel schedule. This is done by walking back along the qubit lines, following along any intervening SWAPs that have been scheduled, until a nontrivial instruction is encountered. The single-qubit queue is then written out onto the parallel schedule from this point onward, with the intention of making use of "unused space" in the parallel schedule that has not already been claimed by the more-important SWAP instructions. When these two queues have both been exhausted, the qubit-pair instruction is finally written out at the next simultaneously available point on that hardware component.

Once an instruction has been dequeued, the addresser 530 continues 636 by determining 612 if there are quantum instructions on the input schedule. If no quantum instructions remain on the input schedule, the compiler terminates 616 the dequeuing process. When terminating the dequeuing process, the addresser 530 may flush any remaining single qubit instructions similar to the manner described above.

The compiler outputs 638 the parallel schedule as addressed quantum instructions 532. Addressed quantum instructions 532 are specific to a particular qubit 312 and quantum processing cell 330. Notably, the addressed quantum instructions 532 may include quantum instructions for multiple quantum processing cells when necessary. Addressed quantum instructions 532 are in a native instruction set for the qubit 312 and quantum processing cell 330 to which they are assigned such that any of the addressed quantum instructions 532 may be executed. Further, the addressed quantum instructions 532 are scheduled such that, as they execute on the quantum processing cell 330, the algorithm 222 executes efficiently.

VII.D Compressor

The compressor 540 inputs addressed quantum instructions 532 and outputs optimized quantum instructions 542. Optimized quantum instructions 542 are optimized to perform the quantum operations encoded in addressed quantum instructions 532 more efficiently. In many cases, the efficiency is dependent on the native instruction set of the qubit to which the addressed quantum instructions are assigned, but could be dependent on other factors as described herein. More generally, the compressor 540 searches for quantum instructions that act on qubits in the same area of a quantum processing cell (e.g., qubit 312A and 312B) and attempts to find more efficient quantum instructions that implement equivalent quantum operations.

The compressor 540 inputs addressed quantum instructions 532 which may be structured as a parallel schedule as previously described. The compressor 540 generates a data structure ("cell schedule") including all quantum instructions for each particular quantum processor 330 in the parallel schedule. That is, a cell schedule includes all the quantum instructions that will be executed by a single quantum processing cell 330. The compressor 540 then reads through the cell schedule and generates a data structure ("qubit schedule") including all quantum instructions for each particular qubit 312 of a quantum processing cell 330. Thus, each qubit schedule includes a sequence of quantum instructions to be executed on each qubit 312 of a quantum processing cell 330. The compressor 540 selects sequences of quantum instructions in a qubit schedule and optimizes that sequence of quantum instructions. Additionally, the compressor 540 may select sequences assigned to, for example, one or two (or more) qubits 312 for optimization.

In one example, the compressor 540 may employ LAP to generate optimized quantum instructions 542. Linear algebraic processing employs one or more algebraic identities to collapse (or otherwise rewrite) a sequence of quantum instructions into a more efficient sequence of quantum instructions. Take for example, quantum instructions on a schedule including:

| CZ | 0 1 |
| CZ | 1 2 |
| CZ | 1 2 |
| CZ | 0 1 |

In this example, the compressor may employ the identity (CZ x y, CZ x y)=(NOP) to generate quantum instructions including:

| CZ | 0 1 |
| CZ | 0 1 |

The compressor again employs the identity to generate optimized quantum instructions including:
NOP In another example, the compressor 540 may employ template based rewriting to generate optimized quantum instructions 542. Template based rewriting takes a selected sequence of quantum instructions on a schedule and generates a new sequence of quantum instructions that would execute more efficiently. When rewriting the instructions, the compressor 540 encodes the selected series of quantum instructions into matrix format. The compressor 540 then executes the selected quantum operations by computing a resulting matrix corresponding to the executed quantum instructions. The compressor 540 then encodes the resulting matrix into optimized quantum instructions 542.

Template based rewriting may have an upper threshold for the number of qubits involved that can be used when rewriting instructions (e.g., 1, 2, 3, . . . , n) in an algorithm 222. In an example, large algorithms are optimized with optimized instructions no longer than a fixed length. For quantum processing cells 330 with relatively few qubits 312, the fixed length may be quite short. For instance, for a series of quantum instructions acting on two qubits 312, template rewriting may have an upper threshold of three qubits 312. That is, the quantum instructions may only entangle quantum states using three or fewer gates. In various embodiments, the fixed length and/or threshold may be selected by a user and/or the compressor 540. In some instances, the quantum instructions resulting from the template based rewriting are further optimized using linear algebraic processing.

Template based rewriting allows for the specification of rules that apply generally to all cases as well as rules that apply specifically to a certain hardware component (e.g., a qubit 312, and/or quantum processing cell 330). Rule specification maintains a flexibility in quantum processing cell 330 design. Additionally, rule specification allows for a given quantum processing cell's performance characteristics to be closely targeted by a compiler 410, since a user of the compiler 410 is free to select different collections of rewriting rules for different quantum processing cell 330 configurations.

Once the compressor 540 generates optimized quantum instructions 542, the compressor 540 may reinsert the optimized quantum instructions 542 in the qubit schedule for further optimization. The compressor 540 can generate optimized quantum instructions 542 any number of times.

Figure 7:
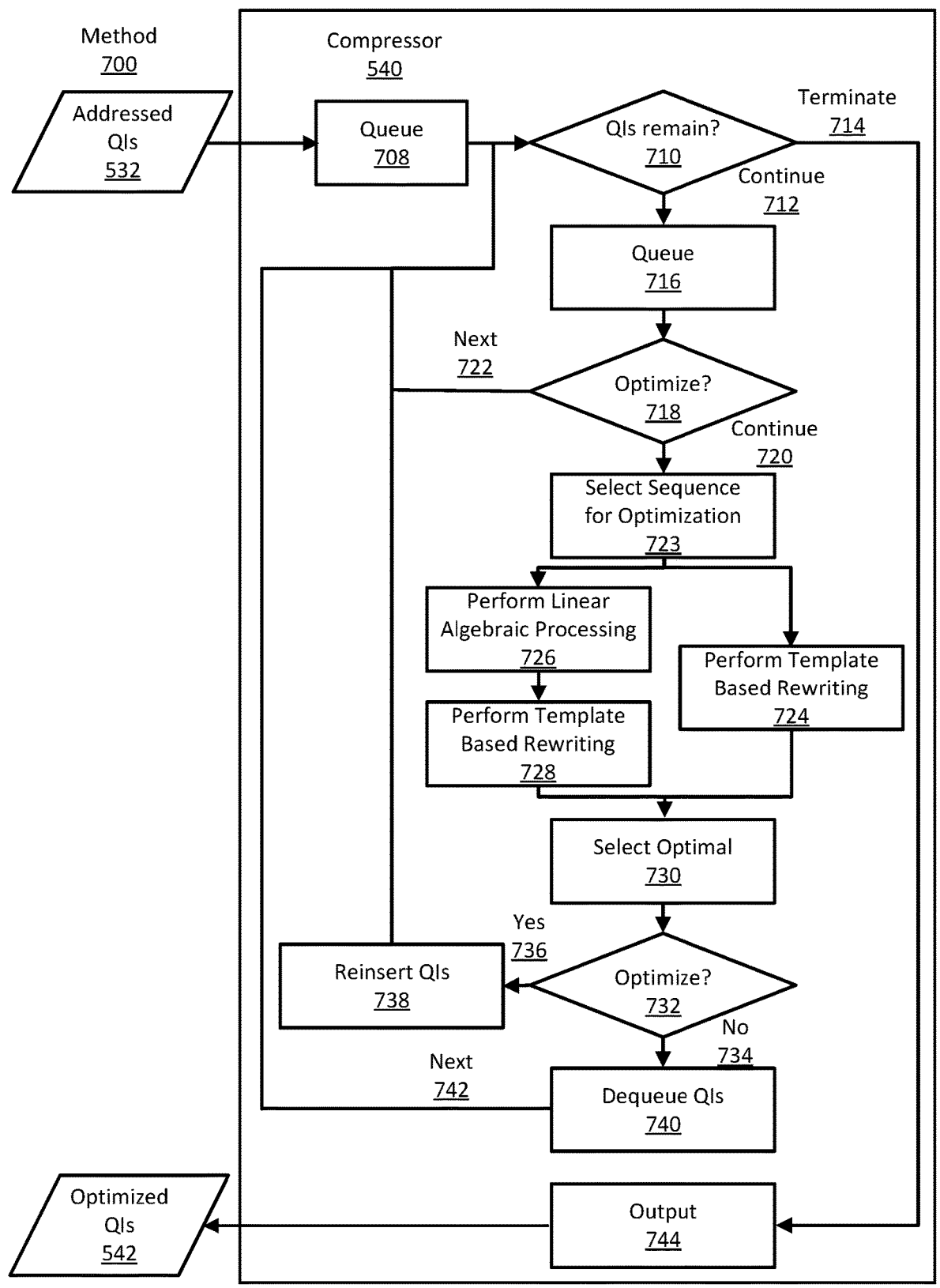
FIG. 7 is a flow diagram of a method implemented by a compressor to generate optimized quantum instructions from addressed quantum instructions, according to one example embodiment.

FIG. 7 is a flow chart of an example method 700 for generating optimized quantum instructions, according to one example embodiment. Method 700 may be implemented using the compressor 540 of the compiler 410. The steps of method 700 may include additional or fewer steps and the steps may be executed in another order.

The compressor 540 inputs addressed quantum instructions 532 and queues 708 the addressed quantum instructions to a cell schedule. The compressor 540 may also input a qubit map describing the location of information on a quantum processing cell 530.

The compressor 540 begins to dequeue 740 quantum instructions if quantum instructions remain 710 on the cell schedule. To do so, the compressor 540 analyzes the quantum instruction at the beginning of the cell schedule. The addresser 540 dequeues a quantum instruction if it is optimized for the qubit to which it is assigned. When a quantum instruction is dequeued it is removed from the qubit schedule to which it is assigned and the next quantum instruction on the cell schedule is analyzed. The compressor 540 continues to dequeue quantum instructions if quantum instructions remain on the cell schedule. The compressor 540 terminates 714 dequeuing instructions if no quantum instructions remain on the cell schedule. This dequeuing process is repeated as many times as possible. Once no quantum instructions remain on the cell schedule the compressor 540 outputs optimized quantum instructions 542.

The compressor 540 determines 710 if quantum instructions remain on the cell schedule. If a quantum instruction remains on the cell schedule, the compressor queues 716 the quantum instruction to the appropriate qubit schedule. That is, the compressor 540 queues a quantum instruction addressed to a particular qubit to the qubit schedule for that qubit. The qubit schedule continues to have quantum instructions queued to it until it is optimized and/or dequeued. The sequence of quantum instructions queued to a qubit schedule are stored in the order which they will be executed on that qubit. For example, every quantum instruction that acts on a qubit (e.g., 312A) in a particular physical location is sequenced and stored in the qubit schedule for that qubit. Each qubit schedule may be said to "control" its associated qubit by feeding it quantum instructions for execution. In some cases, a qubit may be controlled by a qubit schedule of a nearby and/or adjacent qubit.

As quantum instructions are queued to qubit schedules, the compressor 540 determines 718 if quantum instructions on that qubit schedule may be optimized. If the compressor 540 determines 718 that the quantum instructions may be optimized, the compressor continues 720 to optimize the quantum instructions on that qubit schedule. If the compressor 540 determines that the quantum instructions on that qubit schedule may not be optimized, the compressor selects the next 722 quantum instruction on the cell schedule.

The compressor 540 may determine 718 that quantum instructions in a qubit schedule may be optimized in a variety of circumstances. In an example, the compressor 540 determines that quantum instructions in a qubit schedule may be optimized when the qubit schedule has an overflow. In one configuration, an overflow occurs when a qubit schedule is allocated too many quantum instructions. For example, a qubit schedule may allocate memory for storing 100 quantum instructions and the compressor 540 queues 132 quantum instructions to the qubit schedule. In another configuration, an overflow occurs when the number of distinct qubits occurring in a qubit schedule exceeds a threshold number. For example, a qubit schedule for a qubit may have a threshold of 4 qubits and quantum instructions using five distinct qubits are allocated to the qubit schedule which causes an overflow. Once an overflow occurs, the compressor 540 may extract quantum instructions from the overflowing qubit schedule for optimization.

In another example, the compressor 540 optimizes quantum instructions based on the state of a qubit. Here, the state of the qubit indicates if the qubit is being controlled by its qubit schedule or a qubit schedule for another qubit. For example, for a particular qubit, a requesting qubit requests control of, or information from, the particular qubit. The particular qubit may relinquish control of the qubit to the requesting qubit by allowing quantum instructions from qubit schedule of the requesting qubit to be executed on the particular qubit (e.g., for paired qubit instructions). In this case, the compressor 540 may optimize the quantum instructions currently in the qubit schedule for the particular qubit. Take, for example, addressed quantum instructions in the following sequence:

| X  | 0   |
|----|-----|
| CZ | 0 1 |
| Y  | 1   |
| CZ | 1 2 |

The qubit schedule for qubit 1 is currently being governed by the paired qubit instruction "CZ 0 1". The instruction "CZ 1 2" requests control of the qubit schedule for qubit 1. In response, control of qubit 1 is relinquished such that it is controlled by the paired qubit instruction "CZ 1 2". Correspondingly, the compressor 540 optimizes the quantum instructions for the 0-1 pair. In effect, the compressor 540 optimizes quantum instructions in a qubit schedule for a qubit that is "busy" (i.e., being controlled by another qubit schedule).

After determining that qubit instructions may be optimized, the compressor 540 selects 723 quantum instructions from a qubit schedule to generate optimized quantum instructions. The selected quantum instructions can be any number of the quantum instructions on a qubit schedule.

The compressor 540 optimizes the selected quantum instructions. To do so, the compressor 540 duplicates the selected quantum instructions such that that the instructions can be optimized using two methods: (i) perform 724 template based rewriting on a first copy of the selected quantum instructions, and (ii) perform 726 linear algebraic processing and, subsequently perform 728 template based rewriting on a second copy of the selected quantum instructions.

The compressor 540 selects 730 the quantum instructions from either the first (i) or the second (ii) method that are most efficient ("optimal"). In one example, the optimal quantum instructions are the fewest in number, but could be quantified using other metrics of efficiency.

The compressor 540 determines 732 if the selected quantum instructions can be further optimized. If the quantum instructions may be further optimized 736, the compressor reinserts 738 the quantum instructions into the qubit schedule and the compressor reads the next quantum instruction on the cell schedule. If the quantum instructions may not be further optimized, the compressor 550 dequeues 740 the quantum instructions.

As an illustration, the compressor 540 determines that the quantum instructions may be further optimized 736 if the quantum instructions no longer cause an overflow on the qubit schedule. In the alternative, the compressor 540 determines that the quantum instructions may not be further optimized 734 if the quantum instructions still cause an overflow for the qubit schedule. In various other examples, the compressor 540 can determine that quantum instructions on a qubit schedule may be further optimized. For example, the compressor 540 can access a ruleset including a number of optimization rules where each rule can further compress quantum instructions on a qubit schedule. The compressor may test each optimization rule of the ruleset against qubits on the qubit schedule any number of times to determine if quantum instructions may (or may not) be further optimized.

The compressor 540 dequeues 740 quantum instructions that it determines cannot be further optimized. The compressor 540 may also dequeue 740 quantum instructions that remain on qubit schedules when the process terminates 714. In some cases, the compressor may optimize (e.g., selects 723) any quantum instructions that remain on a qubit schedule before dequeuing those quantum instructions. Dequeued quantum instructions may be stored in a data structure representing an optimized qubit schedule ("optimized schedule"). The optimized schedule is similar to the qubit schedule in that each quantum instruction is assigned for execution on a particular qubit 312 of the quantum processor 330. However, in the optimized schedule, the quantum instructions execute more efficiently than in the cell schedule. After dequeuing the quantum instructions, the compressor 540 analyzes the next 742 quantum instruction on the cell schedule.

The compressor outputs 744 the optimized schedule as optimized quantum instructions 542.

VII.E Translator

The translator 550 inputs optimized quantum instructions 542 and outputs code 552 in a target language. Code 552 includes machine readable commands for the control systems 310 and signaling hardware 320 of the quantum processing system 300 that, when executed, execute the optimized quantum instructions 542 on the quantum processing system 300. The input optimized quantum instructions 542 may be structured as an optimized schedule as previously described. The translator queues the optimized quantum instructions in a data structure ("translation schedule") that may be translated by the translator 550. The translator 550 reads through the translation schedule and generates code in a target language for each quantum instruction in the translation schedule.

The translator 550 translates a quantum instruction by converting a quantum instruction into a radio frequency pulse that, when executed by a qubit(s), executes the quantum instruction. Each pulse is a carefully timed event. If a pulse is misaligned temporally, the algorithm 222 will not execute correctly on the quantum processing cell 330. As such, the start and stop times of each pulse are determined when translating a quantum instruction to code 552.

Each pulse is, generally, generated from an underlying waveform. The underlying waveform for a qubit is typically generated by an always-on device that continuously generates a wave of a particular shape (e.g.: sinusoid, square, . . . ), frequency, and amplitude ("wave characteristics" in aggregate). Wave characteristics for a pulse are typically set at the start of operation of the quantum cloud system 200. The wave characteristics may be determined by physical characteristics of a quantum device and/or may be determined as part of a calibration procedure for the quantum processing system 300. The wave characteristics may be fixed for the duration of an algorithm execution. Wave characteristics can be included in an information set for a qubit 312 and/or quantum processing cell 330.

The always-on underlying waveform is turned on and off by an envelope, which transitions from muting the always-on device to performing no dampening. The shape of the transition from muted and undampened, the duration of this transition, and the duration of the undampened period affect the shape of the pulse. As such, the wave characteristics can also include these transitions. More broadly, wave characteristics are all controllable values that must be carefully calculated according to the desired behavior of a qubit 312 when executing a quantum operation. The wave characteristics may be stored in a LL QPC datastore 570 as an information set and accessed by the translator 550 when translating quantum instructions.

Figure 8:
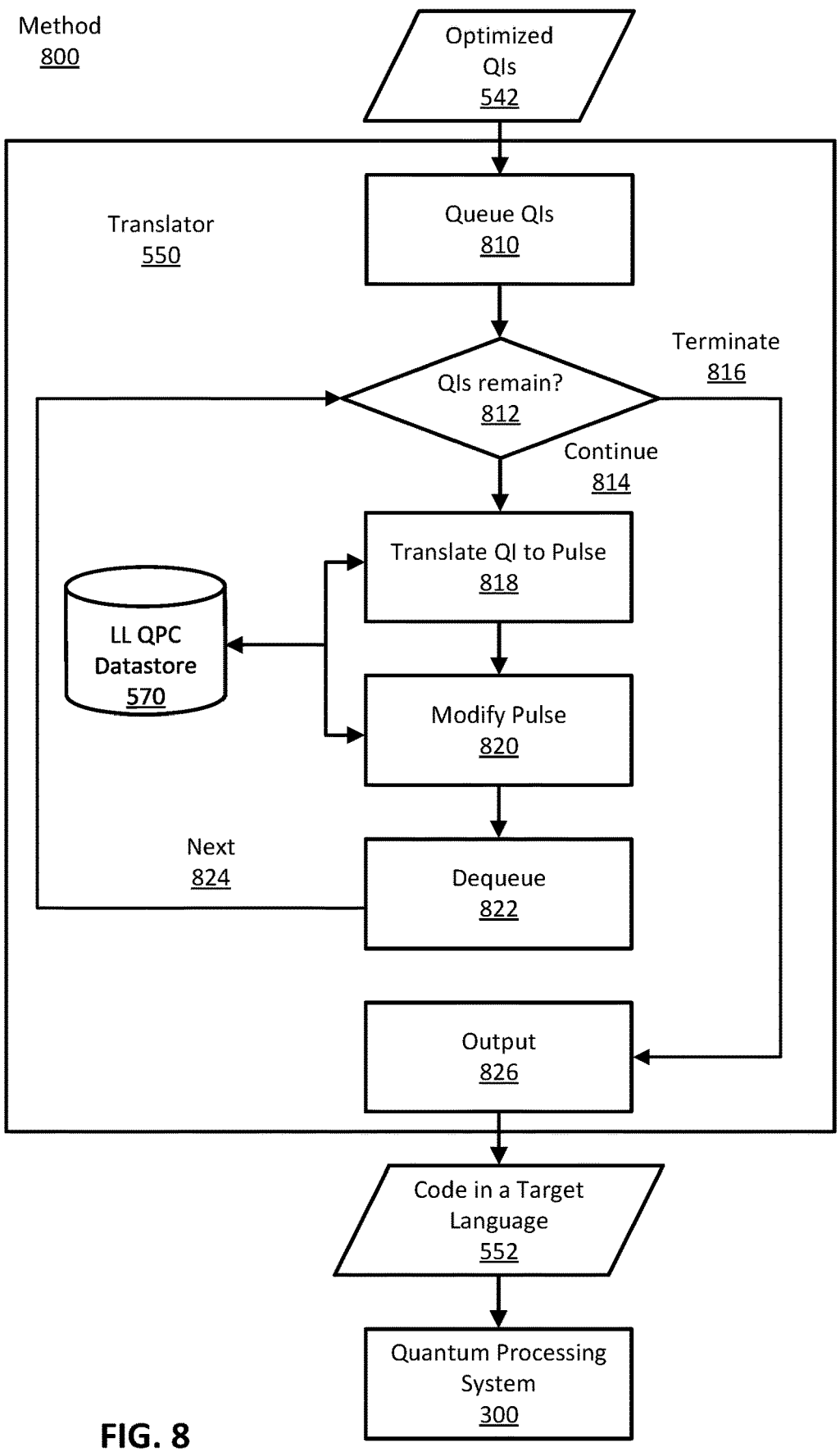
FIG. 8 is flow diagram of a method implemented by a translator to generate code in a target language from optimized quantum instructions, according to one example embodiment.

FIG. 8 is a flow chart of an example method 800 for generating optimized quantum instructions, according to one example embodiment. Method 800 may be implemented using the translator 550 of the compiler 410. The steps of method 800 may include additional or fewer steps and the steps may be executed in another order.

The translator 560 inputs optimized quantum instructions 542 and queues 810 the optimized quantum instructions for translation. The queued quantum instructions may be held in a translation schedule.

The translator 550 begins to dequeue 822 quantum instructions on the translation schedule. To do so, the translator 550 determines 812 if quantum instructions remain on the translation schedule. The translator 550 continues 814 to dequeue quantum instructions if quantum instructions remain on the translation schedule. The translator 550 terminates 816 dequeuing instructions if no quantum instructions remain on the translation schedule. This dequeuing process is repeated as many times as possible. Once no quantum instructions remain on the translation schedule the translator 550 outputs code in a target language.

To dequeue a quantum instruction on the translation schedule, the translator 550 reads the quantum instruction at the beginning of the translation schedule. The translator 550 dequeues 822 the quantum instruction once it has been translated and modified appropriately. When a quantum instruction is dequeued it is removed from the translation schedule and the next quantum instruction on the translation schedule is dequeued.

The translator 550 translates 818 a quantum instruction into a pulse shape for the qubit 312 of the quantum processing cell 330 upon which it be executed. Generally, when translating the quantum instruction to a pulse shape, the translator 560 accesses a reference table (i.e., an information set) including wave characteristics of a radio frequency pulse associated with a particular quantum instruction from the LL QPC datastore 570. The pulse shape may be associated with the specific qubit 312 that will execute the quantum instruction and/or associated with the quantum processing cell 330 that will execute the quantum instruction. The wave characteristics for the pulse may be determined and stored in the LL QPC datastore 570 as part of a calibration process for the quantum processing system 300. Additionally, the reference table may include information describing pulse shapes and wave characteristics for any of the various quantum instructions that may be executed on any of the various qubits 312 of any of the various quantum processing cells 330 of the quantum processing system 300. As such, any quantum instruction included in the translation schedule can be translated by the translator 550.

The translator 550 modifies 820 the pulse shape based on previously translated instructions. As an example, the translator 550 may modify 820 a pulse shape with a temporal offset from a preceding quantum instruction. Further, the translator 550 may modify a pulse shape in other ways based on the quantum instruction or previous quantum instructions. For example, the translator 550 may modify 820 a pulse for executing a RZ operation with frame shifting effects. Other examples of modification are possible, such as, for example, amplitude modulation, and the transposition of frame data between qubits.

The translator 550 may access a reference table including information describing previously scheduled quantum instructions from the LL QPC datastore 570 when modifying pulse shapes. Any modifications to a current pulse shape may also be stored in the reference table such that the modifications may be subsequently accessed by the translator when translating or modifying quantum instructions.

The translator 550 dequeues 822 a quantum instruction that has been translated and modified to a machine schedule. When dequeuing an instruction, the translator generates any number of instructions 552 for control system 310 and signaling hardware 320 of a quantum processing system 300 to achieve the determined pulse shape. The code 552, when executed on the quantum processing system 300, executes the quantum operation on the qubit(s) 312 of the quantum processing cell 330 to which the optimized quantum instruction 542 was assigned. Further, the code 552 is also scheduled temporally such that the instructions execute at the appropriate time on the qubit 312 when executing an algorithm 222 on a quantum processing system 300.

After the translator 550 dequeues a quantum instruction to the machine schedule, the translator reads the next 824 quantum instruction on the translation schedule and translates that quantum instruction (e.g., 814).

If there are no quantum instructions remaining on the translation schedule (e.g., 816), the translator outputs 826 the instructions on the machine schedule as code 552 for the quantum processing system 300. The translator 550 may send the code 552 to the quantum processing system 300 and the quantum processing system 300 may execute the code 552 to execute the algorithm 222.

VIII. Example Optimizations

The compiler 410 described herein optimizes quantum instructions included in an algorithm 222 to increase the efficiency of executing the algorithm 222 on a quantum processing system 330. The compiler 410 can utilize the functionality of any of the parser 510, the control flow analyzer 520, the addresser 530, the compressor 540, and/or the translator 550 in a variety of manners to optimize an algorithm 222 during compilation. This section provides several examples of a compiler 410 optimizing an algorithm 222.

VIII.A Addressing Using Information Sets

In this example, the compiler 410 addresses quantum instructions (e.g., using addresser 530) in an algorithm 222 to qubits 312 of a quantum processing cell 330 such that the algorithm 222 executes on the quantum processing cell 330 efficiently.

Figure 9:
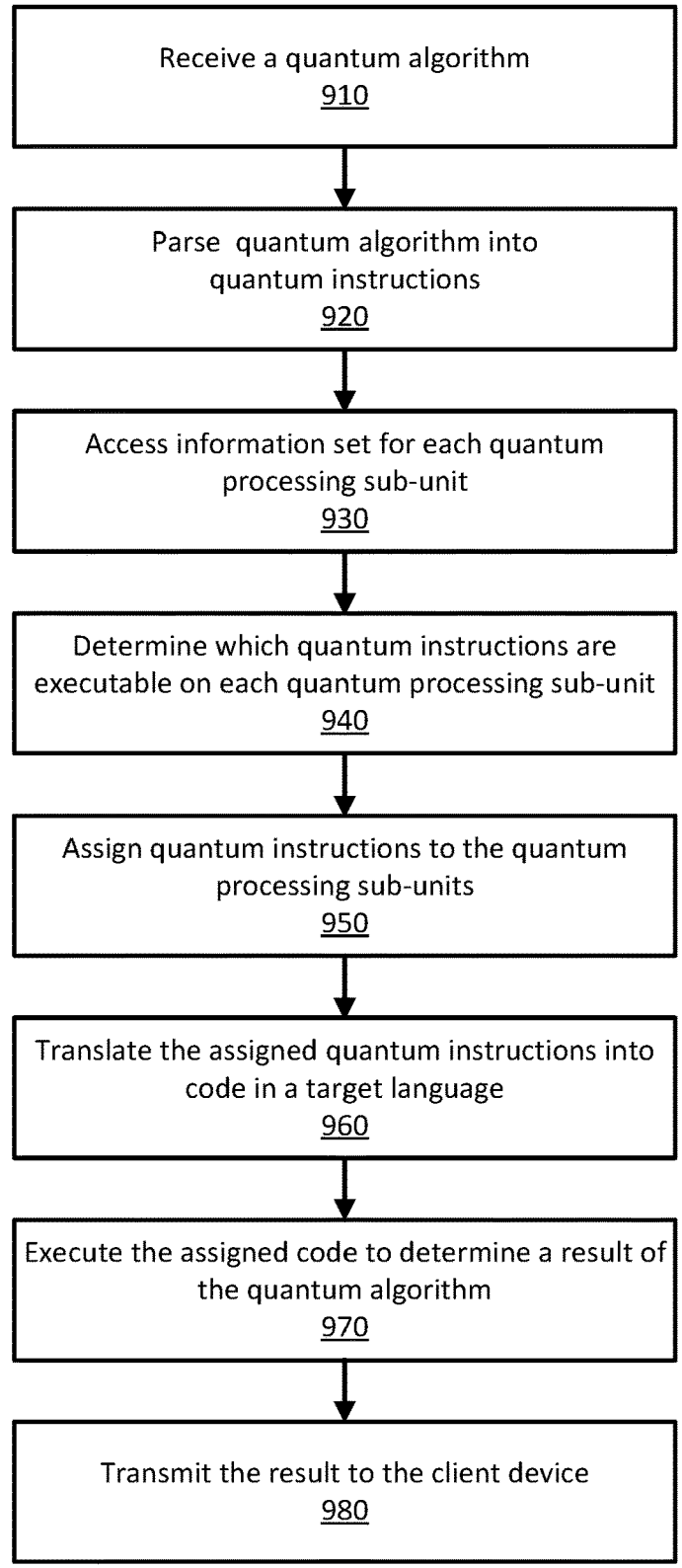
FIG. 9 is flow diagram of a method for determining a result to an algorithm by generating efficient addressed quantum instructions, according to one example embodiment.

FIG. 9 is a flow chart of an example method for 900 generating addressed quantum instructions, according to one example embodiment. Method 900 may be implemented using a compiler 410 of a quantum cloud system 200. The steps of method 900 may include additional or fewer steps and the steps may be executed in another order.

A user operating an access node 210 generates an algorithm 222 using an application 212 executing an API 214 for a quantum cloud system 230. The user transmits the algorithm 222 to the quantum cloud system 230 (in some embodiments via the network 220).

A compiler 410 of the quantum cloud system 200 receives 910 the algorithm and optimizes the algorithm 222 for execution on a quantum processing cell 330 (and its constituent qubits 312) of a quantum processing system 300.

The compiler 410 parses 920 the algorithm 220 into quantum instructions and classical instructions. The classical instructions are for execution on the classical processing system 400 and the quantum instructions are for execution on the quantum processing system 300.

The compiler 410 accesses 930 an information set describing various attributes and characteristics of each qubit 312 on a quantum processing cell 330 of the quantum processing system. The information set describes, for each qubit 312, information that may assist the compiler 410 in assigning quantum instructions to qubits such that an algorithm 222 can execute efficiently. Example information included in an information set is described, at least, below and in Section VII. The compiler 410 may access the information set from the HL QPC datastore 560.

The information set may describe which quantum instructions are executable by each qubit 312 of a quantum processing cell 330. For example, the information set may define that a first qubit can execute a rotation operation while a second qubit cannot execute a rotation operation. Similarly, the information set may define that two particular adjacent qubits can execute a SWAP operation while two different adjacent qubits cannot execute a SWAP operation. Other quantum operations may be defined in the information set.

The information set may describe which quantum instructions of the algorithm 222 have already been assigned to a particular qubit 312. For example, the information set may describe that a first qubit has been assigned quantum instructions to execute three quantum operations: RX, RX, and RZ, respectively, and that a second qubit has been assigned quantum instructions to execute a single SWAP operation.

The information set may include information describing how long, temporally, a quantum instruction or set of quantum instructions takes to execute on a particular qubit 312. For example, the information set may describe that a first qubit takes 25 μs to execute a first quantum instruction and 12 μs to execute a second quantum instruction. The information set may also describe that a second qubit takes 20 μs to execute the first quantum instruction and 15 μs to execute the second quantum instruction. Additionally, the information set may describe that the first qubit takes 37 μs to execute both quantum instructions.

The information set may include information describing the fidelity of a qubit when executing a quantum instruction or set of quantum instructions. For example, the information set may define that a first qubit has a first amount of noise when executing a first quantum instruction. The information set may also define that a second qubit has a second amount of noise when executing a second quantum instruction.

The information set may also include information describing the physical location and connectivity of each qubit 312 of a quantum processing cell 330. For example, the information set may describe the physical location of a first qubit, a second qubit, and a third qubit. The information set may also describe that the first and second qubit are adjacent and may exchange information, while the second and third qubit are not adjacent and cannot exchange information. The information set may also describe that the first and second qubits can execute quantum instructions requiring two qubits, while the second and third qubits cannot.

The compiler 410 assigns 950 quantum instructions to the qubits 312 of a quantum processing cell 330 based on the information set. In one example, the compiler assigns 950 quantum instructions using the aforementioned cost function. That is, addressing quantum instructions to a qubit 312 of a quantum processing cell 330 may be some function of any of the various parameters and information described in an information set for the qubits of the quantum processing cell 330.

Most generally, the compiler 410 only assigns quantum instructions to a particular qubit 312 when the information set indicates that the assignment is allowable. For example, an information set defines that a first qubit can execute an RX quantum operation, a second qubit can execute an RY quantum operation, and third qubit can execute an RZ operation. The information set also defines that the second and third qubit are adjacent and can execute a SWAP operation. In this example, the received quantum instructions include an RX operation, an RY operation, and a SWAP operation. In this case, the compiler 410 assigns 950 the quantum instructions for the RX operation to the first qubit, the quantum instructions for the Y operation to the second qubit, and the quantum instructions for the SWAP operation to the second and third qubits. Importantly, the compiler 410 would not assign quantum instructions for an operation to a qubit 312 that could not execute it. For example, the compiler 410 would not assign the quantum instructions for the SWAP operation to the first and second qubits, nor the quantum instructions for the RY operation to the third qubit.

When assigning quantum instructions to qubits of the quantum processing cell, the compiler 410 can also determine 940 which quantum instructions to assign to particular qubits such that the algorithm 222 executes more efficiently.

As a first example, the compiler 410 may assign 950 quantum instructions based on the physical location of the qubit to which a quantum instruction will be assigned. Take, for example, an algorithm 222 that includes a quantum instruction to perform a "CZ 0 1" operation. The compiler assigns information for the "0" to a first qubit and the information for the "1" to a second qubit. Because the operation requires both qubits to be adjacent and connected, the compiler 410 assigns the information to a first qubit and a second qubit that are adjacent and connected. Additionally, consider, for example, that the algorithm 222 includes a quantum instruction to perform a "CZ 1 2" operation. The compiler 410 assigns 950 information for the "2" to a third qubit. In this case, the third qubit is non-adjacent to the second qubit (including the "1" information) because the adjacent qubits are being used by other quantum operations of the algorithm 222. However, the compiler 410 assigns the information for the "2" to the third qubit because it requires the fewest swapping instructions to move information from the second qubit to a fourth qubit that is adjacent to the third qubit.

As a second example, the compiler 410 may assign 950 quantum instructions based on the number of quantum instructions assigned to the qubits 312 of a quantum processing cell 330. Take, for example, an algorithm 222 that includes a quantum instruction to perform an "X 1" operation. In this example, a first qubit, a second qubit, and a third qubit can all execute the quantum instructions to perform an "X 1" operation. The compiler 410 assigns 950 the quantum instructions to the second qubit because it has the fewest quantum instructions queued for completion. For example, the first qubit may have a Y and a Z operation queued, the third qubit may have an R, Y, and X operation queued, and the second qubit may have an R operation queued.

As a third example, the compiler 410 may assign 950 quantum instructions based on the speed at which a quantum instruction may be executed on a qubit. Take, for example, an algorithm 222 that includes a quantum instruction to perform a "Z 2" operation. In this example, a first qubit and a second qubit can both execute the quantum instructions to perform a "Z 2" operation. The compiler 410 assigns 950 the quantum instructions to the second qubit because the instruction would execute faster than on the first qubit. Here, "faster" can include one of two meanings: independent of the instruction queue, or with consideration of the instruction queue. First, for example, both the first and second qubit have no prior quantum instructions queued. Based on an information set, the compiler 410 determines 940 that the first qubit executes a Z operation in 32 µs while the second qubit executes a Z operation in 25 µs. As such, the compiler 410 assigns 950 the quantum operation to the second qubit because it executes faster on the second qubit. Second, for example, both the first and second qubits have prior instructions queued. For example, the first qubit may have a SWAP operation queued, the second qubit may have an R and a Y operation queued. Based on the information set, the compiler 410 determines 940 that the first qubit will execute the SWAP operation in 55 µs and the second qubit will execute the R and Y operations in 34 µs, combined. In this case, the "Z 2" operation executes in 12 µs on the first qubit and 15 µs on the second qubit. As such, the compiler 410 assigns 950 the quantum operation to the second qubit because the total execution time is faster. That is, the total execution time of the set of quantum operations on the second qubit is less than the total execution of the quantum operations on the first qubit, despite the individual quantum operation executing more quickly on the first qubit.

There are many other instances in which the compiler 410 may assign 950 quantum instructions to qubits. For example, the compiler 410 may assign 950 quantum instructions to qubits based on the qubit's coherence time. In this case, quantum instructions that take longer to execute may be scheduled for execution on qubits that have longer coherence. In this manner, a qubit is unlikely to lose coherence during execution of a quantum operation. In another example, the compiler 410 may assign 950 quantum instructions to qubits based on the gate performance relative to a qubit. In this case, certain quantum instructions may be scheduled on a qubit that has higher fidelity relative to other qubits. In another example, the compiler 410 may assign 950 quantum instructions to qubits based on the graph degree of the quantum instructions (e.g., a number of incident edges in a quantum circuit). Similarly/alternatively, the compiler 410 may assign 950 quantum instructions to qubits that have locally convenient graph degrees. Many other examples are possible.

The preceding examples are intended to be illustrative and non-limiting. Many other examples of assigning quantum instructions based on information included in the information set are possible. Further, as previously described, assigning quantum instructions to qubits 312 of a quantum processing cell may use a cost function that assigns various weights and scores to various information. For example, a cost function may value proximity of qubits 312 over execution time of particular operations when assigning quantum instructions. A cost-function can take many forms and may be generated by a user and/or an architect of the quantum cloud system 230.

The compiler 410 translates 960 the assigned quantum instructions into code 552 in a target language. The code 552, when executed by the quantum processing system 300, cause each qubit 312 of a quantum processing cell 330 to execute quantum instructions that were assigned to that qubit 312. In aggregate, the code, when executed, determines a result 224 of the algorithm 222 when executed.

The compiler 410 transmits the code 552 to the quantum processing system 300.

The quantum processing system 300 executes 970 the code 552 to determine a result 224 of the algorithm 222. That is, the quantum processing cell 330 executes code to implement the quantum instructions included in the algorithm 222. The quantum processing system 300 may measure a qubit(s) 312 of the quantum processing cell 330 when determining the result 224.

The quantum cloud system 230 transmits 980 the result to the agent 210 via the network 220.

VIII.B Compression by Parallel Computation

In this example, the compiler 410 optimizes quantum instructions (e.g., using compressor 540) in an algorithm 222 such that the algorithm 222 executes on a quantum processing cell 330 efficiently.

Figure 10:
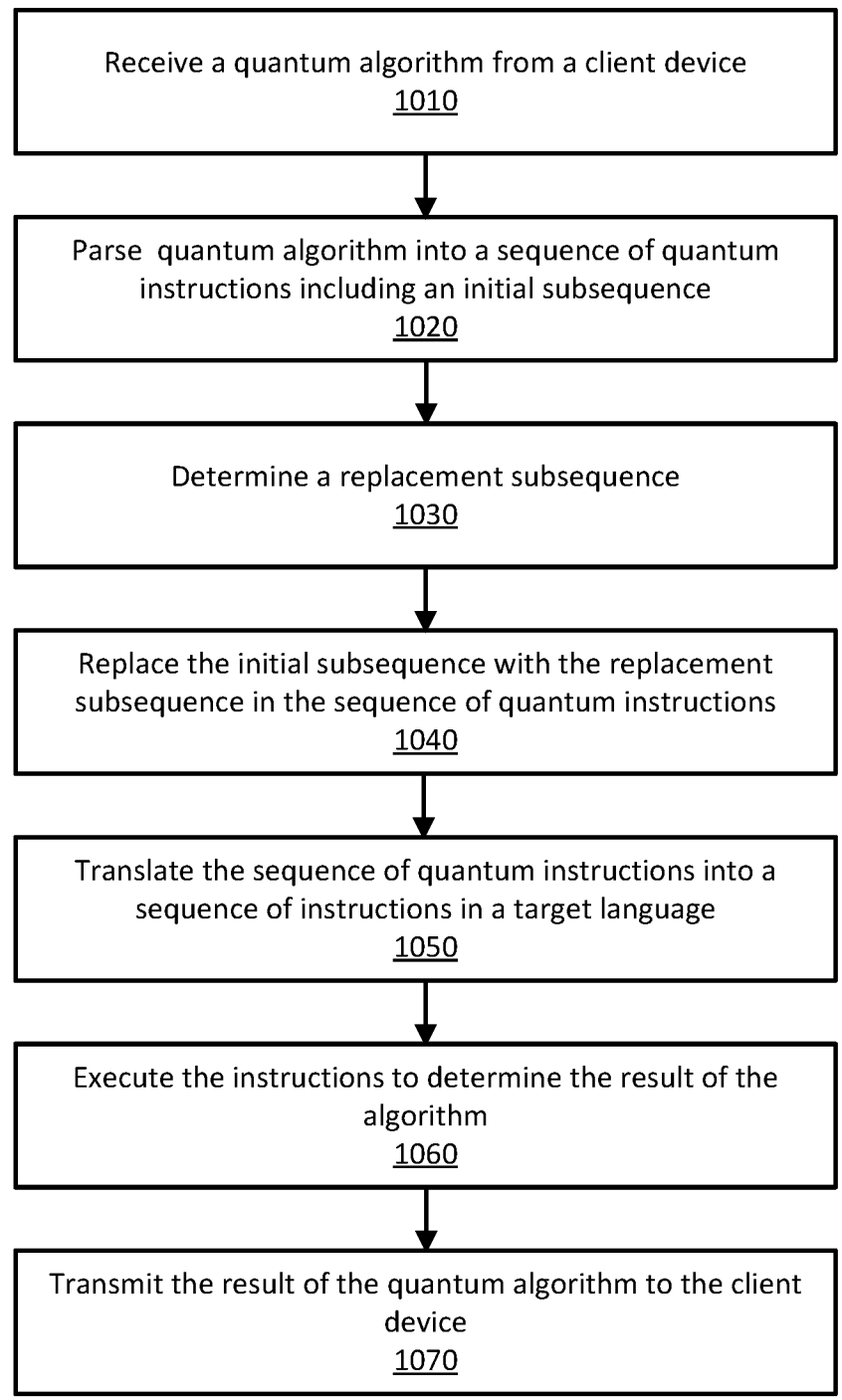
FIG. 10 is flow diagram of a method for determining a result to an algorithm by efficiently replacing subsequences of quantum instructions in the algorithm, according to one example embodiment.

FIG. 10 is a flow chart of an example method 1000 for generating optimized quantum instructions, according to one example embodiment. Method 1000 may be implemented using a compiler 410 of a quantum cloud system 200. The steps of method 1000 may include additional or fewer steps and the steps may be executed in another order.

A user operating an access node 210 generates an algorithm 222 using an application 212 executing an API 214 for a quantum cloud system 230. The user transmits the algorithm 222 to the quantum cloud system 230 (in some embodiments via the network 220).

A compiler 410 of the quantum cloud system 200 receives 1010 the algorithm and optimizes the algorithm 222 for execution on the quantum processing system 300.

The compiler 410 parses 1020 the algorithm 220 into quantum instructions and classical instructions. The classical instructions are for execution on the classical processing system 400 and the quantum instructions are for execution on the quantum processing system 300. The quantum instructions include an initial subsequence of quantum instructions that manipulate a quantum state(s). That is, the initial subsequence, when executed by the quantum processing system 300, manipulates a quantum state(s) to determine a sub-result of the state.

The compiler 410 determines 1030, using processors of the classical processing system 400, a replacement subsequence of quantum instructions. The replacement subsequence manipulates the quantum state similarly, but more efficiently than the initial subsequence of quantum instructions. That is, the replacement subsequence, when executed by the quantum processing system 300, similarly manipulates the quantum state to determine the same sub-result of the state, but does so more efficiently. For example, the replacement subsequence may have fewer instructions, execute in less time, require fewer swapping instructions, etc.

In some examples, the compiler 410 determines 1030 the replacement subsequence according to a replacement policy. The replacement policy, broadly, may define any constraints for determining a replacement subsequence. For example, the replacement policy may define a maximum size of a quantum state that may be replaced (e.g., one qubit, two qubits, etc.). In another example, the replacement policy may define a maximum number of qubits replacement instructions can simultaneously manipulate. Take, for example, a quantum processing system configured with qubits that execute single and paired qubit instructions. In this case, the replacement policy may define that the replacement subsequence can only manipulate one and two qubits simultaneously.

Additionally, in some configurations, a user of the quantum cloud system 230 may guide implementation of the replacement policy. For example, a replacement policy may, generally, be akin to a set of replacement rules that can be applied to various sequences and subsequences of quantum instructions to determine replacement subsequences. Given this context, the user of the quantum cloud system 230 may choose to implement some replacement rules of the replacement policy while not implementing other replacement rules of the replacement policy. In other words, in these configurations, the compiler 410 does not enforce the constraints of a replacement policy without the authorization of a user. A user may define which rules to implement when defining an algorithm 222.

In some examples, the compiler 410 may determine 1030 a replacement subsequence by converting each quantum instruction in the initial sequence into matrix format and, correspondingly, executing the matrix multiplications representing the quantum instructions. In this case, the replacement subsequence may be converted to an executable quantum instruction from the result of the matrix multiplications. The compiler 410 may determine a set of native quantum instructions that can execute the result of the matrix multiplication when converting to the executable quantum instruction. An example of this is provided below.

The compiler 410 replaces 1040 the initial subsequence with the replacement subsequence in the sequence of quantum instructions.

The compiler 410 translates 1050 the sequence of quantum instructions into code 552 in a target language. The code 552, when executed by the quantum processing system 300, cause each qubit 312 of a quantum processing cell 330 to execute quantum instructions that were assigned to that qubit 312. In aggregate, the code 552 executes and determines a result 224 of the algorithm 222 when executed. More particularly, the code 552 includes a sequence of instructions 552 that, when executed, manipulate the quantum state to determine the sub result.

The compiler 410 transmits the code 552 to the quantum processing system 300.

The quantum processing system 300 executes 1060 the code to determine a result 224 of the algorithm 222. That is, the quantum processing cell 330 executes code 552 to implement the quantum instructions included in the algorithm 222. The quantum processing system 300 may measure a qubit(s) 312 of the quantum processing cell 330 when determining the result 224.

The quantum cloud system transmits 1070 the result to the agent 210 (in some embodiments via the network 220).

To provide context, a specific example of the compiler 410 determining a replacement subsequence will be described.

The compiler 410 receives 1010 an algorithm 222 and parses 1020 the algorithm 222. The parsed algorithm is a sequence of quantum instructions including the initial subsequence of quantum instructions in the following paragraph.

Initial subsequence:

| ... | |
|---|---|
| RX($\pi/2$) | 0 |
| CNOT | 0 1 |

| | |
|---|---|
| RZ(0.2) | 1 |
| CNOT | 0 1 |
| RX(−π/2) | 0 |
| RX(π/2) | 1 |
| CNOT | 0 1 |
| RZ(−0.2) | 1 |
| CNOT | 0 1 |
| RX(−π/2) | 1 |
| H | 0 |
| RX(π/2) | 1 |
| CNOT | 0 1 |
| RZ(1.2) | 1 |
| CNOT | 0 1 |
| H | 0 |
| RX(−π/2) | 1 |
| ... | |

The compiler 410 determines 1030 a replacement subsequence of quantum instructions. To do so, the compiler 410 converts each quantum instruction in the initial subsequence to its matrix format and executes the initial subsequence by performing the corresponding matrix multiplications. For example, the first quantum instruction in the initial subsequence, in matrix format, is:

$$QI_1 = \begin{bmatrix} \frac{1}{\sqrt{2}} & \frac{i}{\sqrt{2}} & 0 & 0 \\ \frac{i}{\sqrt{2}} & \frac{1}{\sqrt{2}} & 0 & 0 \\ 0 & 0 & \frac{1}{\sqrt{2}} & \frac{i}{\sqrt{2}} \\ 0 & 0 & \frac{i}{\sqrt{2}} & \frac{1}{\sqrt{2}} \end{bmatrix} \quad (1)$$

and the second quantum instruction in the initial subsequence, in matrix format is:

$$QI_2 = \begin{bmatrix} 1 & 0 & 0 & 0 \\ 0 & 0 & 0 & 1 \\ 0 & 0 & 1 & 0 \\ 0 & 1 & 0 & 0 \end{bmatrix} \quad (2)$$

The compiler 410 executes the first two quantum instructions, in matrix format, by multiplying the two matrices together. The resulting matrix is:

$$RM_{1,2} = \begin{bmatrix} \frac{1}{\sqrt{2}} & \frac{i}{\sqrt{2}} & 0 & 0 \\ 0 & 0 & \frac{i}{\sqrt{2}} & \frac{1}{\sqrt{2}} \\ 0 & 0 & \frac{1}{\sqrt{2}} & \frac{i}{\sqrt{2}} \\ \frac{i}{\sqrt{2}} & \frac{1}{\sqrt{2}} & 0 & 0 \end{bmatrix} \quad (3)$$

The compiler 410 proceeds to multiply the remaining quantum instructions in the initial subsequence, in matrix format, to determine the sub-result of the initial subsequence. In this example, the sub-result, in matrix format, of the initial subsequence is:

$$RM_{16,17} = \begin{bmatrix} 0.811 & -0.138 & 0.138 & -0.551 \\ 0.138 & 0.811 & -0.551 & -0.138 \\ -0.026 & 0.567 & 0.823 & 0.026 \\ 0.567 & 0.026 & -0.026 & 0.823 \end{bmatrix} \quad (4)$$

The compiler 410 then determines 1030 a replacement subsequence of quantum instructions that results in the same sub-result (e.g., $RM_{16,17}$). Here, because the sub-result is a non-native quantum instruction for the quantum processing system 330, the compiler 410 determines a sequence of quantum instructions in the native instruction set for the quantum processing system 300 that would achieve the same sub-result.

The native quantum instructions in a replacement subsequence depend on the configuration of the quantum processing system 300 as previously described. In one example embodiment, the compiler 410 determines 1030 the replacement subsequence in the following paragraph for a particular configuration of a quantum processing system 300.

Replacement subsequence:

| | |
|---|---|
| RZ(π) | 0 |
| RX(π/2) | 0 |
| RX(π/2) | 1 |
| CZ | 0 1 |
| RZ(1.65) | 0 |
| RX(−π/2) | 0 |
| RZ(−1.93) | 0 |
| RX(π/2) | 0 |
| RX(π/2) | 1 |
| RZ(0.2) | 1 |
| RX(−π/2) | 1 |
| CZ | 0 1 |
| RZ(1.78) | 0 |
| RX(−π/2) | 0 |
| RX(π/2) | 1 |
| RZ(π) | 1 |

The replacement subsequence manipulates that quantum states similarly to the initial subsequence. That is, the replacement subsequence, once executed, has the same sub-result as the initial subsequence. Notably, the replacement subsequence includes a 66% percent reduction in two-qubit operations. As such, execution of the replacement subsequence is more efficient than the initial subsequence.

The compiler 410 then replaces 1040 the initial subsequence with the replacement subsequence in the sequence, translates 1050 the sequence into code 552 in a target language, executes 1060 the code on the quantum processing system 300 to determine a result 224 of the algorithm 222, and transmits 1070 the result 224 to the agent 210.

In the preceding example, the compiler 410 assumed no knowledge of the state of the quantum processing system 300 when determining the replacement subsequence. That is, the compiler 410 does not have knowledge of the working state of a particular qubit(s) 312 to which the initial subsequence is applied. As such, the compiler 410 runs simulations over a basis of all possible states of the quantum processing system 300 when determining a replacement subsequence. Simulations such as these can be highly inefficient.

In a situation where a state of the quantum processing system 300 (e.g., a qubit state) is known, the compiler 410 may simulate quantum instructions of the initial subsequence on the known qubit state rather than all possible qubit states. Generally, simulations on a single qubit state result in a replacement subsequence that is more efficient than a replacement subsequence simulated from all basis states.

As an example, a qubit of the quantum processing system is initialized to the ground state and the initial subsequence acts on the initialized qubit. The compiler 410 determines 1030 a replacement subsequence that generates a target state as the sub-result. That is, for example, the replacement subsequence generates a target state from the initialized ground state. Subsequent quantum instructions in the sequence of quantum instructions act on the target state rather than the initialized ground state.

To illustrate, consider, for example, the initial subsequence described above. The initial subsequence acts on a qubit initialized to the ground state ("initial qubit"). That is, the initial qubit, in matrix format, is represented as:

$$QS_i = \begin{bmatrix} 1 \\ 0 \\ 0 \\ 0 \end{bmatrix} \quad (5)$$

As before, the compiler 410 determines 1030 a replacement subsequence by executing, in matrix format, the quantum instructions of the initial subsequence on the initial qubit. For example, referring to Eqn. 1, the first quantum instruction acting on the initial qubit results in the following matrix:

$$QS_{i,1} = \begin{bmatrix} \frac{1}{\sqrt{2}} \\ \frac{i}{\sqrt{2}} \\ 0 \\ 0 \end{bmatrix} \quad (6)$$

The compiler 410 proceeds to multiply remaining quantum instructions in the initial subsequence, in matrix format, to determine the target state (i.e., the sub-result) of the initial subsequence. In this example, the target state, in matrix format, of the initial subsequence is:

$$QS_{16,17} = \begin{bmatrix} 0.811 \\ 0.138 \\ -0.026 \\ 0.567 \end{bmatrix} \quad (7)$$

The compiler 410 then determines 1030 a replacement subsequence of quantum instructions that results in the target state. The compiler 410 may again convert quantum instructions using native quantum instructions for the quantum processing system 300 to achieve the target state. In this example embodiment, the compiler 410 determines 1030 the replacement subsequence for a particular configuration of a quantum processing system 300 in the following paragraph.

Replacement subsequence:

| | |
|---|---|
| RZ(0.97) | 0 |
| RX(π/2) | 0 |
| RZ(1.30) | 0 |
| RX(−π/2) | 0 |
| RZ(−0.52) | 1 |

-continued

| | |
|---|---|
| RX(π/2) | 1 |
| RZ(−1.84) | 1 |
| RX(−π/2) | 1 |
| CZ | 1 0 |
| RX(π/2) | 0 |
| RZ(1.31) | 0 |
| RX(−π/2) | 0 |
| RX(π/2) | 1 |
| RZ(2.68) | 1 |
| RX(−π/2) | 1 |

Here, the replacement subsequence includes an 83% percent reduction in two-qubit operations relative to the initial subsequence. Notably, execution of this replacement subsequence the quantum processing system 300 produces the same result as the initial subsequence if the initial state is the ground state as described.

The compiler 410 then replaces 1040 the initial subsequence with the replacement subsequence in the sequence, translates 1050 the sequence into code 552 in a target language, executes the code 552 on the quantum processing system 300 to determine a result 224 of the algorithm 222, and transmits 1070 the result 224 to the agent 210.

VIII.C Control Flows for Parametric Execution

In this example, the compiler 410 optimizes quantum instructions in an algorithm 222 such that the algorithm 222 executes on a quantum processing cell 330 efficiently. Here, the algorithm 222 includes a parametric quantum function. A parametric function is any quantum function that will execute across a range of variables. For example, a parametric function may be the calculation of the energy levels for an infinite quantum well for a range of quantum well widths.

In traditional quantum compilers, an algorithm 222 including quantum instructions for a parametric function is compiled for each variable of the parametric function. Often, this compilation only changes a few of the generated instructions and, as such, is inefficient for executing the algorithm 222 on a quantum processing system. In contrast to these traditional compilers, the compiler 410 more efficiently executes algorithms 222 which have a parametric function with a relatively low amount of arithmetic complexity. For example, the compiler 410 is able to perform peephole rewriting on translated instructions 552 representing the parametric functions. That is, code 552 may include a variable call which accesses a variable of the range of variables when executing the algorithm 222. In this manner, the compiler 410 only compiles the algorithm once 222 and is able to execute all of the variables in the range of variables for a parametric function.

To provide more context, a parametric function may be an implementation of a variable function. A variable function is a description of mathematical operations on a collection of variables. The mathematical operations may be arithmetical, algebraic, transcendental, irrational, etc. The variables of a variable function may represent real or abstract quantities, memory addresses, memory contents, etc. A variable function can be supplied as a parameter to a gate of a quantum processing system 400 (i.e., as a parametric function). For example, the variable function 2.0·x+1.0 where x represents a quantity in a memory (e.g., shared memory 240) that may be supplied to the parametric quantum gate RZ as RZ·(2.0·x+1.0).

Variables for a variable function are free-form. However, generally, variables fall into several categories: (i) quantities in random-access memory, shared memory, or another storage medium that can be retrieved for modulation of a gate, (ii) angular quantities representing rotations on a Bloch sphere, (iii) temporal quantities indicating a duration (e.g., RF pulse duration, gate duration, etc.), (iv) stored calibration factors that can be retrieved at run-time, and (v) mathematical optimization variables intended for maximization or minimization of functions.

Figure 11:
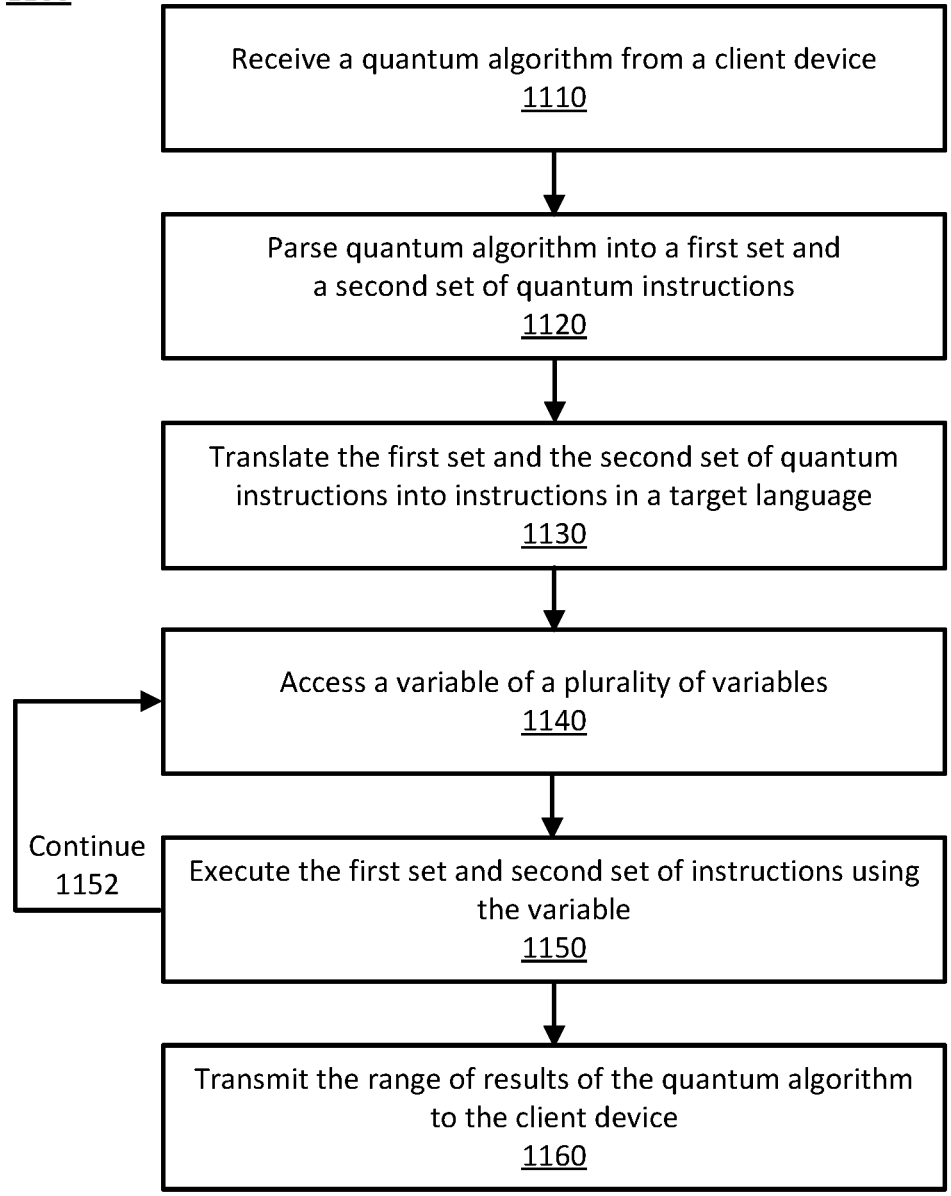
FIG. 11 is flow diagram of a method for determining a range of results for an algorithm including a quantum parametric function by efficiently generating code in a target language, according to one example embodiment.

FIG. 11 is a flow chart of an example method for 1100 generating code in a target language for quantum instructions representing a parametric function, according to one example embodiment. Method 1100 may be implemented using a compiler 410 of a quantum cloud system 200. The steps of method 1100 may include additional or fewer steps and the steps may be executed in another order.

A user operating an access node 210 generates an algorithm 222 using an application 212 executing an API 214 for a quantum cloud system 230. The user transmits the algorithm 222 to the quantum cloud system 230 (in some embodiments via the network 220).

A compiler 410 of the quantum cloud system 200 receives 1110 the algorithm and optimizes the algorithm 222 for execution on the quantum processing system 300.

The compiler 410 parses 1120 the algorithm 220 into quantum instructions and classical instructions. The classical instructions are for execution on the classical processing system 400 and the quantum instructions are for execution on the quantum processing system 300. The quantum instructions include a first set of quantum instructions for executing the parametric function and a second set of quantum instructions including the remainder of the quantum instructions in the algorithm. In aggregate, the first set and the second set of quantum instructions, when executed on the quantum processing system 300, determine a result 224 of the algorithm 222 for one variable of the range of variables. The classical instructions may store the range of variables in the shared memory 240 for accessing when executing the algorithm on the quantum processing system 300.

The compiler 410 translates 1130 the first set and the second set of quantum instructions into a first set and a second set, respectively, of instructions in a target language. The first set of instructions include a call to a variable of the range of variables. That is, the first set of instructions accesses a variable of the range of variables such that, when executed, the instructions execute the variable function of the algorithm 222 using the access variable on the quantum processing system 300. The second set of instructions, when executed, execute the remainder of the algorithm 222 on the quantum processing system 300.

The compiler 410 transmits the first set and the second set of the translated instructions to the quantum processing system 330.

To determine the result of the algorithm 222 for the range of variables, the quantum processing system 300 accesses 1140 a first variable of the range of variables to execute in the first set of instructions.

The quantum processing system 300 executes 1150 the first set and the second set of the instructions to determine the result 224 of the algorithm 222 for the first variable. Here, the first set of instructions, when executed in aggregate, determine the result of the parametric function of the algorithm 222. The second set of instructions, when executed, execute the remainder of the algorithm. The quantum processing system 300 may measure a qubit(s) of the quantum processing system 300 when determining the result.

To continue 1152, the quantum processing system 300 accesses 1140 a second variable of the range of variables to execute in the first set of instructions. The quantum processing system executes the first set and the second set of instructions to determine the result 224 of the algorithm 222 for the second variable. This process continues 1152 until the quantum processing system 300 has determined the result 224 of the algorithm 222 for each variable in the range of variables.

In another embodiment, rather than accessing a variable during each execution, the compiler 410 may generate an array of instructions in a target language for execution on the quantum processing system. The array of instructions includes instructions for execution of each variable of the range of variables. The quantum processing system 300 may execute the array of quantum instructions to determine the range of results.

Once the quantum processing system 330 determines a result for each variable in the range of variables, the quantum processing system 300 transmits 1160 the range of results to the agent via access node 210 (in some embodiments via the network 220).

To provide context, a specific example of a compiler 410 determining the result 224 of an algorithm 222 including a parametric function will be described.

The compiler 410 receives 1110 an algorithm 222 from an agent 210 (in some embodiments via the network 220). The algorithm 222 includes a parametric function for execution on a quantum processing system 300. The compiler 410 parses the algorithm into classical and quantum instructions. An example algorithm 222, in a quantum programing language, is given in the next paragraph.

Algorithm
DECLARE ro BIT[4]
DECLARE theta REAL
set up initial state
X 0
X 1
build the exponentiated operator
RX(pi/2) 0
H 1
H 2
H 3
CNOT 0 1
CNOT 1 2
CNOT 2 3
RZ(theta) 3
CNOT 2 3
CNOT 1 2
CNOT 0 1
RX(-pi/2) 0
H 1
H2
H3
measure out the results
MEASURE 0 ro[0]
MEASURE 1 ro[1]
MEASURE 2 ro[2]
MEASURE 3 ro[3]

In this algorithm 222, the first set of quantum instructions include "RZ(theta) 3". The first set of quantum instructions execute the parametric function because the instruction "RZ(theta) 3" references a parameter value (i.e., variable). The remainder of the quantum instructions in the algorithm 222 are included in the second set of quantum instructions. Here, the 'DECLARE' statements describe classical storage locations for runtime-determined parameter values for a parametric function. The compiler 410 cannot generate a fully represented machine instruction for the "RZ(theta) 3" quantum instruction at compile time because it references a classically stored parameter.

When parsing (and/or addressing) the quantum instructions, the compiler 410 may also convert the quantum instructions of the native gate set of the quantum processing system 300 that will execute the algorithm 222. Additionally, the compiler 410 may use any of the compression techniques described herein. For example, the compiler 410 generates the optimized quantum instructions 542 in the following paragraph for the above algorithm.

Optimized Quantum Instructions:
DECLARE ro BIT[4]
DECLARE theta REAL
RX(pi) 3
RZ(pi) 0
RX(pi/2) 0
RZ(pi/2) 2
RX(pi/2) 2
RZ(pi/2) 2
RZ(-pi/2) 3
RX(-pi/2) 3
RZ(theta[0]) 3
RX(pi/2) 3
CZ 3 2
RZ(pi/2) 1
RX(pi/2) 1
RZ(pi/2) 2
RX(pi/2) 2
CZ 2 1
RX(pi/2) 1
CZ 1 0
RZ(pi) 0
RX(-pi/2) 0
RZ(pi/2) 1
RX(pi) 1
RZ(pi/2) 2
RX(pi) 2
RZ(pi/2) 3
RX(pi) 3
MEASURE 3 ro[3]
MEASURE 2 ro[2]
MEASURE 1 ro[1]
MEASURE 0 ro[0]

Here, the "RZ(theta[0]) 3" instruction ("parametric instruction") is the first set of quantum instructions and the remainder of the quantum instructions is the second set of quantum instructions.

In this example of optimized quantum instructions 542, the compiler 410 converts all of the quantum instructions into "RX", "RZ", and "CZ" operations. Additionally, the state preparation technique described herein eliminates the initial string of CNOTs from the original algorithm 222. In this case, the state of the quantum processing system 300 is fully determined before the execution of the parametric operation. As such, the quantum instructions before the parametric instructions can be said to generate a target state. After application of the parametric instruction, the state of the quantum processing system becomes unknown. Accordingly, the compiler 410 proceeds to optimize the quantum instructions after the parametric instructions assuming an unknown state of the quantum processing system.

The compiler 410 translates 1130 the first set and second set of quantum instructions into instructions 550 in a target language. Unfortunately, listing a corresponding set of instructions for each set of quantum instructions is beyond the scope of this document. However, to clarify this example, the first set of instructions, when executed on the quantum processing system 300, execute the parametric instruction. Similarly, the second set of instructions, when executed by the quantum processing system, execute the remainder of the quantum instructions in the algorithm 222.

The compiler 410 transmits the instructions in a target language to the quantum processing system 300. The quantum processing system 300 accesses 1140 a first parameter of the range of parameters for executing in the first set of instructions.

The quantum processing system 300 executes 1150 the first and second set of instructions to determine a result 224 in a range of results as described above. That is, the first set of instructions execute the parametric function and the second set of instructions execute the remainder of the algorithm.

The quantum processing system 330 continues 1152 the process of accessing variables and executing instructions for each variable in the range of variables to determine a result in the range of results.

The quantum processing system 300 transmits 1160 the range of results to the agent.

IX. Example Compiler Implementations

As previously described, the locations of the elements and processes described in the environment 200 of FIG. 2 allow for additional configurations of a quantum cloud system 230. That is, for different configurations, a compiler 410 may compile an algorithm 222 using different methods while maintaining the same, or highly similar, functionality of the quantum cloud system 230. Whatever the configuration, the quantum cloud system 230 inputs an algorithm 222, the compiler 410 compiles the algorithm 222 by generating code 552 in a target language executable by a quantum processing system 300, and the quantum processing system 300 executes the code 552 to determine a result 224 of the algorithm 222.

Three additional configurations of a quantum cloud system 230 are described below. While the illustrated configurations include two of each element (e.g., access node 210, quantum processing system 300, etc.) the configurations may have any number of elements.

IX.A Monolithic Architecture

Figure 12:
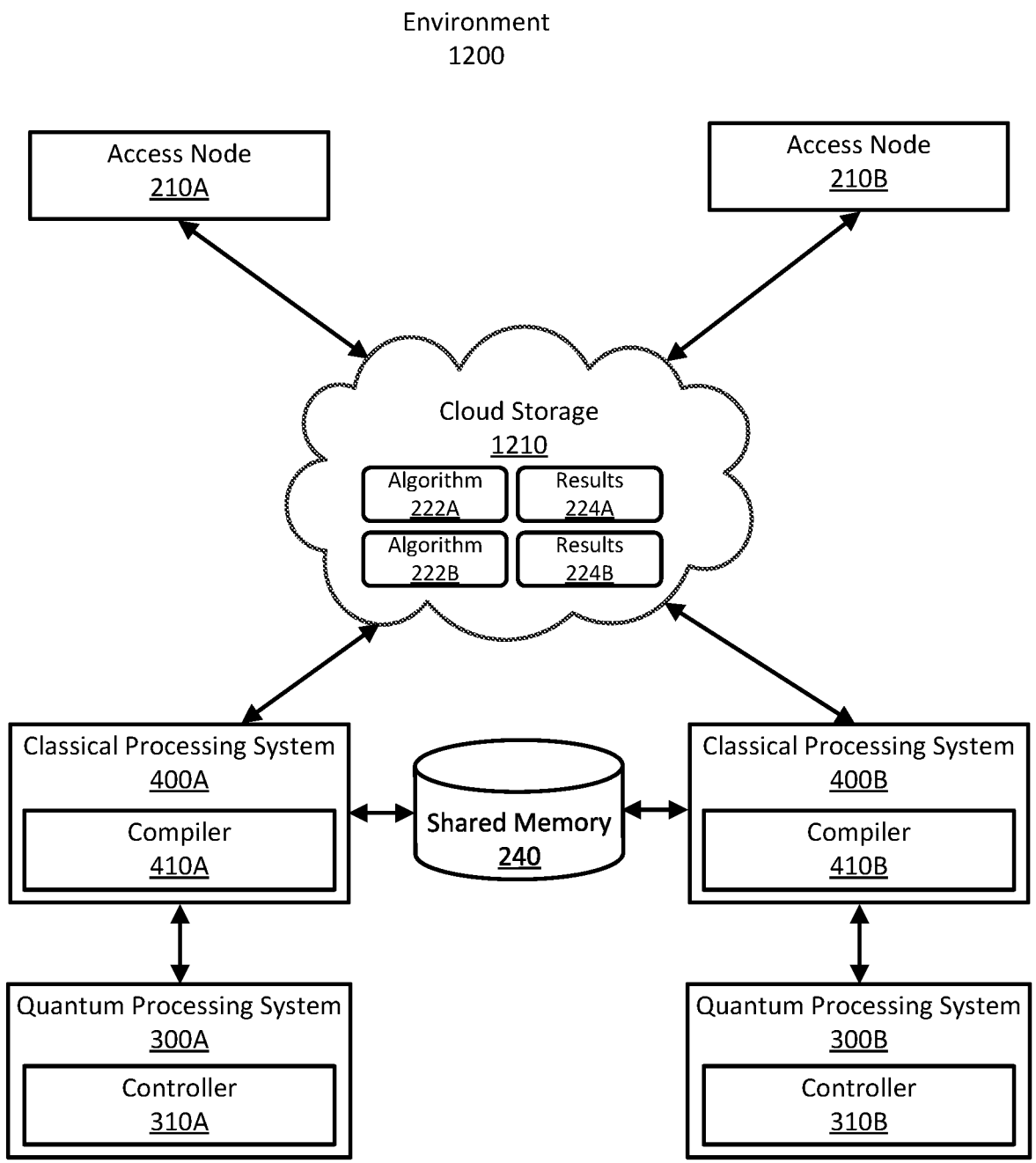
FIG. 12 is an illustration of an environment implementing a quantum cloud system as a monolithic entity, according to one example embodiment.

FIG. 12 illustrates an environment 1200 implementing the quantum cloud system 230 as a monolithic entity ("monolithic architecture"). Here, the quantum cloud system includes a number of classical processing systems 400 with each including a compiler 410. Each classical processing system 400 controls a quantum processing system 300.

The classical processing system 400 accesses an algorithm 222 submitted to a job queue by an access node 210. In this environment 1200, the job queue is implemented as a cloud storage device 1210. When a classical processing system 400 retrieves an algorithm 220 from the job queue, the classical processing system 440 runs the compiler 410 locally and passes the compiler 410 the retrieved algorithm 222. The compiler 410 generates code 552 in a target language to execute the algorithm 222 on a quantum processing system 300 as described herein. Once generated, the classical processing system 400 transmits the code to its associated quantum processing system 300. A controller 310 of the quantum processing system 300 executes the code on the quantum processing system. Once executed, the quantum processing system 300 transmits the result 224 of the executed algorithm to the job queue and the access node 210 can access the result. In this example, because compilation happens in a single instance, data describing the quantum processing system 300 (e.g., information sets, qubit maps, etc.) is stored in a reference data store (e.g., shared memory 240).

IX.B Micro-service Architecture

A deficiency of the monolithic architecture is the blocking nature of the environment. That is, each algorithm 222 is processed from start to finish by a sequence of non-parallelizable steps. For example, in the environment 1200 of FIG. 12, if a controlling classical processing system 400 for a quantum processing system 300 pulls an algorithm 222 from the job queue that has a long compile time, the hardware of the quantum processing system 300 is idle while the compiler 410 compiles the algorithm 222. This may still occur if other algorithms 222 in the job queue have shorter compilation times.

Figure 13:
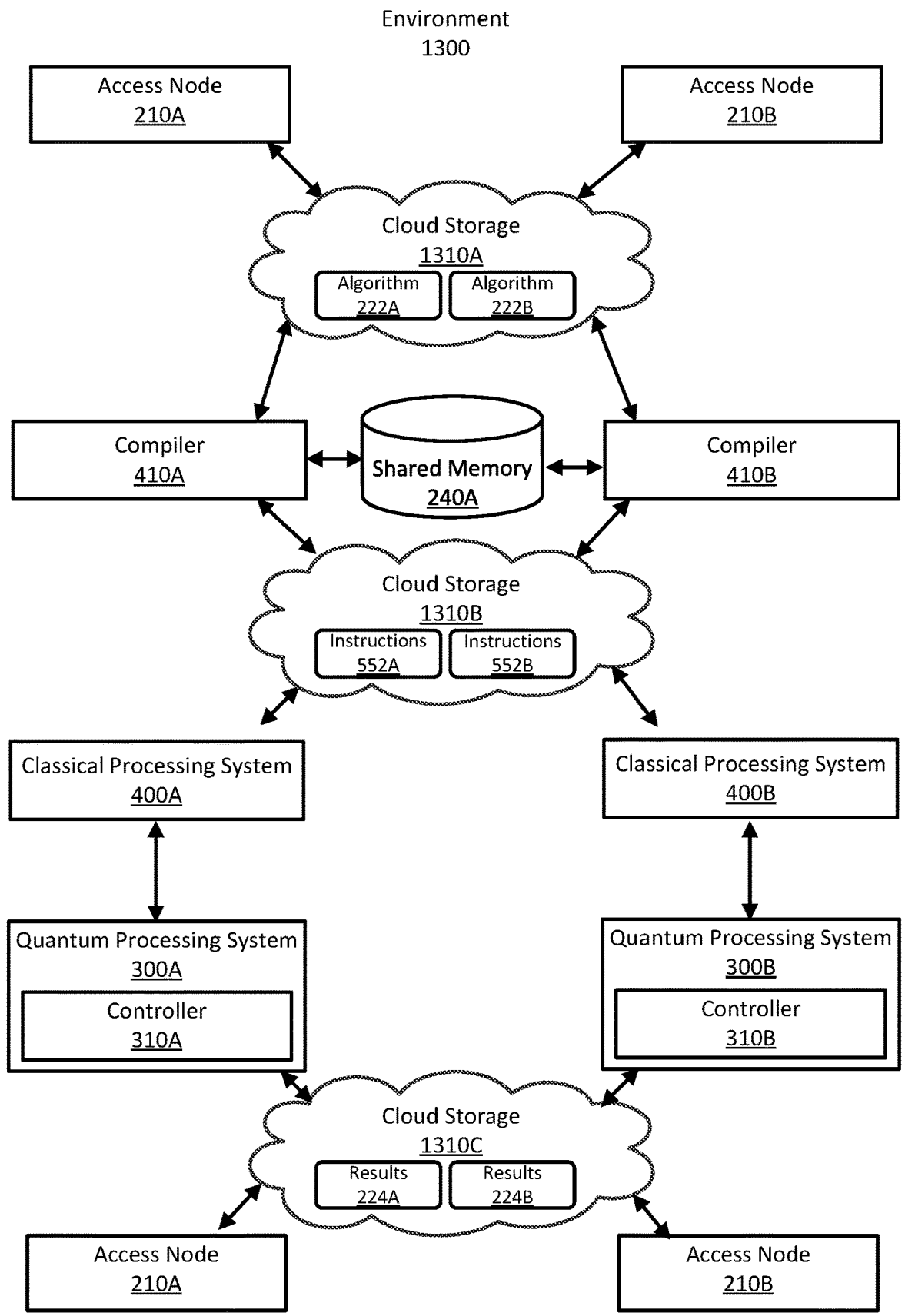
FIG. 13 is an illustration of an environment implementing a quantum cloud system as a micro-service architecture, according to one example embodiment.

FIG. 13 illustrates an environment 1300 implementing the quantum cloud system using a micro-service architecture. The micro-service architecture reduces the blocking problem experienced in the monolithic architecture.

In the environment of FIG. 13, an access node 210 submits an algorithm 222 to a job queue. Again, the job queue is implemented as, for example, a cloud storage system 1310A. In this environment 1300, a number of compilers 410 are executing on independent systems. A compiler 410 may, for example, execute on a standalone processing system or may be hosted on a network system. In this example, a compiler 410 retrieves an algorithm 220 from the job queue and generates code 522 in a target language to execute the algorithm 222 on a quantum processing system 300 as described herein. The compiler 410 can access data describing the quantum processing systems 400 (e.g., information sets, qubit maps, etc.) stored in a reference data store (e.g., shared memory 240).

Once generated, the classical processing system 400 transmits the code 522 to a quantum job queue. The quantum job queue can be accessed by any number systems which reduces the blocking problem seen in the environment 1200. The quantum job queue can be implemented as a cloud storage system 1310B.

The environment 1300 includes a number of classical processing systems 400, with each classical processing system 400 controlling execution of code 522 (i.e., algorithms 222) on a quantum processing system 300. Here, the classical processing system 400 accesses code 522 from the quantum job queue and passes the code 522 to a quantum processing system 300. A controller 310 of the quantum processing system 300 executes the code 522 on the quantum processing system 300. Once executed, the quantum processing system 300 transmits the result 224 of the executed code 552 to a results queue and an access node 210 can access the result. The results queue can be implemented as a cloud storage system 1310C.

IX.C Tiered Just-in-time Processing Architecture

A deficiency of the micro-service architecture is that volatile information used when generating code in a target language may change by the time a quantum processing system executes the code. For example, if the compilation time is slow while the execution time of the code on a quantum processing system is fast, the code in the quantum job queue may execute with lower fidelity than when they were originally generated by the compiler. Thus, an environment where a compiler takes a final compiling pass on instructions in a quantum job queue that include time-sensitive data immediately before execution of the instructions would be beneficial.

Figure 14:
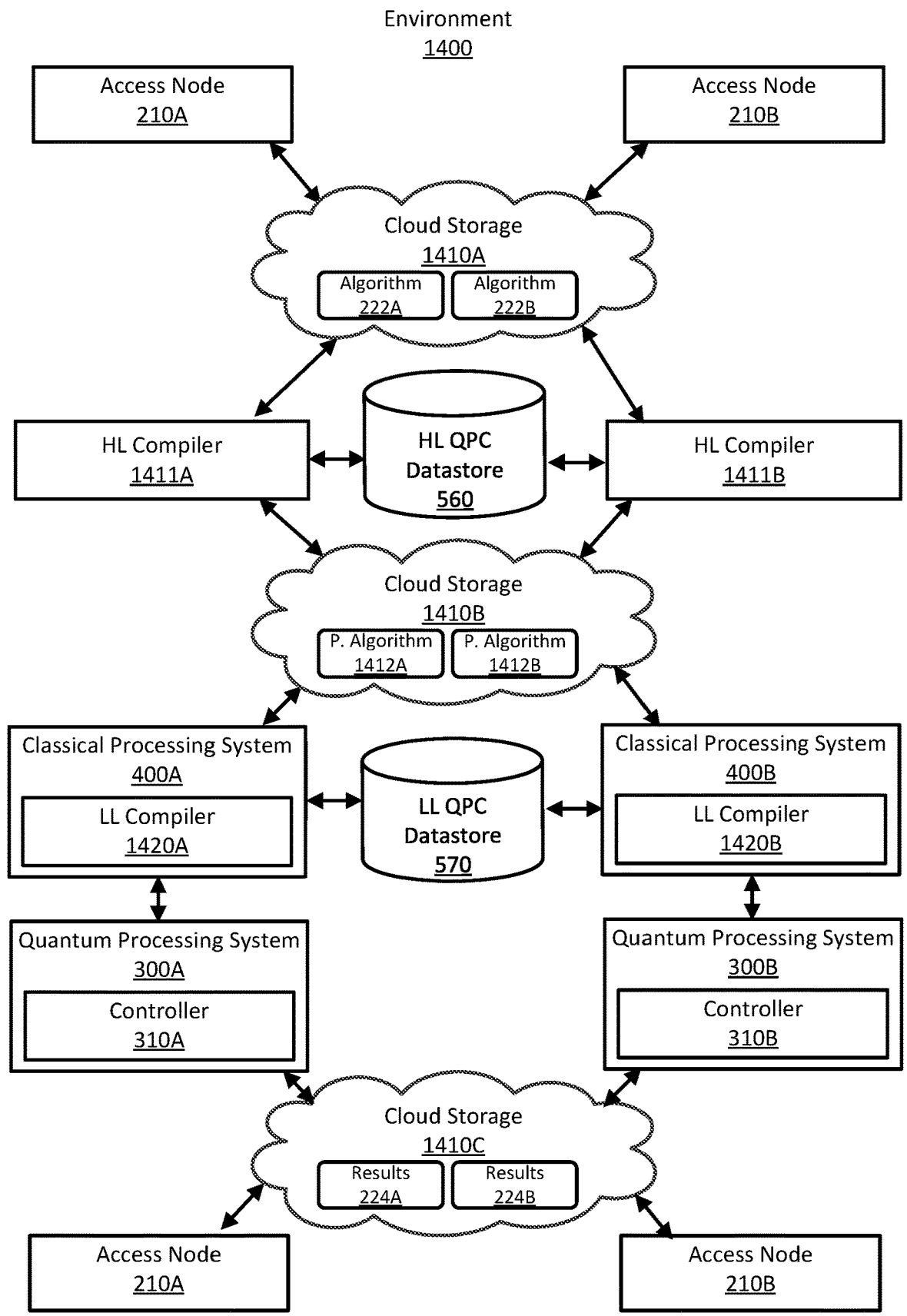
FIG. 14 is an illustration of an environment implementing a quantum cloud system as a tiered just-in-time architecture, according to one example embodiment.

FIG. 14 illustrates an environment 1400 implementing the quantum cloud system 230 using a tiered just-in-time service architecture ("JIT architecture"). The JIT architecture reduces the time sensitive compilation problems experienced in the micro-service architecture.

In the environment 1400 of FIG. 14, an access node 210 submits an algorithm 222 to a job queue. Again, the job queue is implemented as, for example, a cloud storage system 1410A. In this environment 1400, a number of high level compilers ("HL compiler") 1411 execute on independent systems. Here, a HL compiler 1411 may include any of the functionality of the compiler 410. In this example, a compiler 410 retrieves an algorithm 220 from the job queue and generates a partial algorithm 1412. The partial algorithm 1412 may be, for example, a syntax tree 512, segmented quantum instructions 522, addressed quantum instructions 532, optimized quantum instructions 542, and or code 552 in a target language. The HL compiler 1411 can access data describing the quantum processing systems 400 (e.g., information sets, qubit maps, etc.) stored in a high-level reference data store (e.g., HL QPC datastore 560). Generally, information in the reference data store is non-volatile information that does not change often.

Once generated, the classical processing system 400 transmits the partial algorithm 1412 to a quantum job queue. The quantum job queue can be accessed by any number of systems. The quantum job queue can be implemented as a cloud storage system 1410B.

The environment 1400 includes a number of classical processing systems 400, with each classical processing system 400 controlling execution of instructions 522 (i.e., algorithms 222) on a quantum processing system 300. Each classical processing system 400 includes a LL compiler 1420 that can compile a partial algorithm into code in a target language for execution on a quantum processing system. Here, a HL compiler 1410 may include any of the functionality of the compiler 410. The LL compiler 1420 can access data describing the quantum processing systems 400 (e.g., information sets, qubit maps, etc.) stored in a low-level reference data store (e.g., LL QPC datastore 570). Generally, information in the reference data store is volatile information that changes often.

Once compiled, the LL compiler 1420 passes the generated code in a target language to a quantum processing system 300. A controller 310 of the quantum processing system 300 executes the code on the quantum processing system 300. Once executed, the quantum processing system 300 transmits the result 224 of the executed machine instruction to a results queue and an access node 210 can access the result. The results queue can be implemented as a cloud storage system 1410C.

X. Additional Considerations

Although the detailed description contains many specifics, these should not be construed as limiting the scope of the invention but merely as illustrating different examples and aspects of the invention. It should be appreciated that the scope of the invention includes other embodiments not discussed in detail above. For example, although quantum program instructions are shown herein as coming from main memory 404, the program instructions may originate from any memory store on the quantum cloud system 230. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for executing a quantum algorithm including a variable function, the method comprising:
    receiving, from a client device, the quantum algorithm for execution on a quantum processor, the quantum algorithm including the variable function to execute across a plurality of variables to determine a range of results of the quantum algorithm;
    parsing the quantum algorithm into a plurality of quantum instructions, a first set of the quantum instructions including quantum instructions for executing the variable function, and a second set of the quantum instructions including a remainder of the quantum instructions;
    translating the first set of quantum instructions into a first set of instructions in a target language for executing on the quantum processor, the first set of instructions configured to execute the variable function across the plurality of variables;
    translating the second set of quantum instructions into a second set of instructions in the target language for executing on the quantum processor;
    for each variable in the range of variables,
        executing the first set of instructions on the quantum processor to execute the variable function across the plurality of variables,
        executing the second set of instructions on the quantum processor, and wherein
        the first and second set of instructions, when executed, determine the range of results of the quantum algorithm;
    transmitting the range of results of the quantum algorithm to the client device.

2. The method of claim 1, wherein executing the first set and the second set of quantum instructions further comprises:
    initializing the quantum processor to an initial state.

3. The method of claim 1, wherein executing the first set and the second set of quantum instructions further comprises:
    storing the result of the range of results in a memory unit of a classical processing system.

4. The method of claim 1, wherein the quantum processor includes a plurality of quantum processing sub-units, and further comprising:
    for a first variable in the plurality of variables, executing the first set and the second set of instructions to determine a first result of the range of results on a first quantum processing sub-unit; and
    for a second variable in the plurality of variables, executing the first set and the second set of instructions to determine a second result of the range of results on a second quantum processing sub-unit.

5. The method of claim 1, wherein parsing the quantum algorithm into a plurality of quantum instructions further comprises:
    accessing a native gate set of the quantum processor, the native gate set representing the quantum gates executable by the plurality of quantum processing sub-units;
    wherein the plurality of quantum instructions are quantum instructions included in the native gate set of the quantum processor.

6. The method of claim 1, wherein translating the first set and the second set of variable instructions into instructions in the target language for executing on the quantum processor further comprises:
    accessing a set of configured machine instructions from the quantum processor; and
    parsing the quantum instructions into machine instructions of the configured machine instructions.

7. The method of claim 1, wherein the variable function is a mathematical function including any of: an arithmetical function, an algebraic function, a transcendental function, or an irrational function.

8. The method of claim 1, wherein executing the first set of instructions in the target language on the quantum processor to execute the variable function across the plurality of variables further comprises:
    accessing each variable from the plurality of variables from a classical storage system.

9. The method of claim 1, further comprising:
    storing the plurality of variables in a classical storage system.

10. A system for determining a result of a quantum algorithm including a variable function, the system comprising:
    a quantum processing system configured to execute quantum instructions of the quantum algorithm;
    a classical processing system including one or more processors; and a non-transitory, computer-readable storage medium storing a computer program executable by the classical processing system to perform steps comprising:
receiving, from a client device via the classical processing system, the quantum algorithm for execution on the quantum processing system, the quantum algorithm including the variable function to execute across a plurality of variables to determine a range of results of the quantum algorithm;
parsing the quantum algorithm into a plurality of quantum instructions, a first set of the quantum instructions including quantum instructions for executing the variable function, and a second set of the quantum instructions including a remainder of the quantum instructions;
translating the first set of quantum instructions into a first set of instructions in a target language for executing on the quantum processing system, the first set of instructions configured to execute the variable function across the plurality of variables;
translating the second set of quantum instructions into a second set of instructions in the target language for executing on the quantum processing system;
for each variable in the range of variables,
executing the first set of instructions on the quantum processing system to execute the variable function across the plurality of variables,
executing the second set of instructions on the quantum processing system, and wherein
the first and second set of instructions, when executed on the quantum processing system, determines the range of results of the quantum algorithm; and
transmitting the range of results of the quantum algorithm to the client device.

11. The system of claim 10, wherein the computer program executable for executing the first set and the second set of quantum instructions on the quantum processing system is further executable to perform steps comprising:
initializing the quantum processor to an initial state.

12. The system of claim 10, wherein the computer program executable for executing the first set and the second set of quantum instructions is further executable to perform steps comprising:
storing the result of the range of results in a memory unit of a classical processing system.

13. The system of claim 10, wherein the quantum processing system includes a plurality of quantum processing sub-units, and the computer program is further executable to perform steps comprising:
for a first variable in the plurality of variables, executing the first set and the second set of instructions to determine a first result of the range of results on a first quantum processing sub-unit; and
for a second variable in the plurality of variables, executing the first set and the second set of instructions to determine a second result of the range of results on a second quantum processing sub-unit.

14. The system of claim 10, wherein the computer program executable for parsing the quantum algorithm into a plurality of quantum instructions is further executable to perform steps comprising:
accessing a native gate set of the quantum processing system, the native gate set representing the quantum gates executable by a plurality of quantum processing sub-units on the quantum processing system;
wherein the plurality of quantum instructions are quantum instructions included in the native gate set of the quantum processor.

15. The system of claim 10, wherein the computer program for translating the first set and the second set of variable instructions into instructions for executing on the quantum processor is further executable to perform steps comprising:
accessing a set of configured machine instructions from the quantum processing system; and
parsing the quantum instructions into machine instructions of the configured machine instructions.

16. The system of claim 10, wherein the variable function is a mathematical function including any of: an arithmetical function, an algebraic function, a transcendental function, or an irrational function.

17. The system of claim 10, wherein the computer program instructions for executing the first set of instructions in the target language on the quantum processing system to execute the variable function across the plurality of variables are further executable to perform steps comprising:
accessing each variable from the plurality of variables from a classical storage system.

18. The system of claim 10, wherein the computer program is further executable to perform steps comprising:
storing the plurality of variables in a classical storage system.

19. A non-transitory computer-readable storage medium storing computer instructions for determining a result of a quantum algorithm including a variable function, the computer instructions, when executed by one or more processors, causing the one or more processors to:
receive, from a client device, the quantum algorithm for execution on a quantum processor, the quantum algorithm including the variable function to execute across a plurality of variables to determine a range of results of the quantum algorithm;
parse the quantum algorithm into a plurality of quantum instructions, a first set of the quantum instructions including quantum instructions for executing the variable function, and a second set of the quantum instructions including a remainder of the quantum instructions;
translate the first set of quantum instructions into a first set of instructions in a target language for executing on the quantum processor, the first set of instructions configured to execute the variable function across the plurality of variables;
translate the second set of quantum instructions into a second set of instructions in the target language for executing on the quantum processor;
for each variable in the range of variables,
execute the first set of instructions on the quantum processor to execute the variable function across the plurality of variables,
execute the second set of instructions, and wherein
the first and second set of instructions, when executed, determine the range of results of the quantum algorithm;
transmit the range of results of the quantum algorithm to the client device.

20. The non-transitory storage medium of claim 19, wherein the quantum processing system includes a plurality of quantum processing sub-units, and the computer program instructions are further executable to perform steps comprising:

for a first variable in the plurality of variables, executing the first set and the second set of instructions to determine a first result of the range of results on a first quantum processing sub-unit; and for a second variable in the plurality of variables, executing the first set and the second set of instructions to determine a second result of the range of results on a second quantum processing sub-unit.

* * * * *